(12) United States Patent
Hudec

(10) Patent No.: US 9,216,791 B2
(45) Date of Patent: Dec. 22, 2015

(54) BICYCLE SUSPENSION SYSTEM

(71) Applicant: Christopher Hudec, Nanaimo (CA)

(72) Inventor: Christopher Hudec, Nanaimo (CA)

( * ) Notice: Subject to any disclaimer, the term of this patent is extended or adjusted under 35 U.S.C. 154(b) by 0 days.

(21) Appl. No.: 14/719,219

(22) Filed: May 21, 2015

(65) Prior Publication Data

US 2015/0251724 A1    Sep. 10, 2015

Related U.S. Application Data

(63) Continuation-in-part of application No. 14/005,177, filed as application No. PCT/CA2012/000236 on Mar. 14, 2012, now Pat. No. 9,039,026.

(60) Provisional application No. 61/452,423, filed on Mar. 14, 2011.

(51) Int. Cl.
    *B62K 25/04*      (2006.01)
    *B62K 25/28*      (2006.01)
    *B62J 1/02*      (2006.01)

(52) U.S. Cl.
    CPC . *B62K 25/04* (2013.01); *B62J 1/02* (2013.01); *B62K 25/286* (2013.01); *B62K 2025/045* (2013.01)

(58) Field of Classification Search
    CPC . B62K 25/04; B62K 25/286; B62K 2025/045
    See application file for complete search history.

(56) References Cited

U.S. PATENT DOCUMENTS

| | | | |
|---|---|---|---|
| 4,789,174 A | 12/1988 | Lawwill | |
| 5,121,937 A | 6/1992 | Lawwill | |
| 5,205,572 A | 4/1993 | Buell et al. | |
| 5,244,224 A | 9/1993 | Busby | |
| 5,441,292 A | 8/1995 | Busby | |
| 5,460,396 A * | 10/1995 | Sutter et al. | 280/284 |
| 5,509,679 A | 4/1996 | Leitner | |
| 5,553,881 A | 9/1996 | Klassen et al. | |
| 5,628,524 A | 5/1997 | Klassen et al. | |
| 5,899,480 A | 5/1999 | Leitner | |
| 5,957,473 A | 9/1999 | Lawwill | |
| 6,099,010 A | 8/2000 | Busby | |
| 6,206,397 B1 | 3/2001 | Klassen et al. | |
| 6,843,494 B2 | 1/2005 | Lam | |
| 6,969,081 B2 | 11/2005 | Whyte | |
| 7,048,292 B2 | 5/2006 | Weagle | |

(Continued)

FOREIGN PATENT DOCUMENTS

| | | |
|---|---|---|
| GB | 2454021 | 4/2009 |
| WO | 99/10224 | 3/1999 |
| WO | 2008/025950 | 3/2008 |

OTHER PUBLICATIONS

Office Action from the U.S. Patent and Trademark Office for U.S. Appl. No. 14/005,177 (mailed Sep. 3, 2014).

(Continued)

*Primary Examiner* — Joseph Rocca
*Assistant Examiner* — Gabriela C Craciun
(74) *Attorney, Agent, or Firm* — Klarquist Sparkman, LLP

(57) ABSTRACT

A bicycle rear suspension system including a seat stay member pivotally mounted to the bicycle frame, a chain stay member to which the rear tire is mounted and to which the seat stay member is pivotally attached at a location above the wheel mount, a link pivotally connected to the frame and to a frame-ward end of the chain stay member, and a shock absorber device.

19 Claims, 13 Drawing Sheets

(56) References Cited

U.S. PATENT DOCUMENTS

| | | | |
|---|---|---|---|
| 7,066,481 B1 | 6/2006 | Soucek | |
| 7,100,930 B2 | 9/2006 | Saiki | |
| 7,128,329 B2 | 10/2006 | Weagle | |
| 7,240,912 B2 | 7/2007 | Whyte | |
| 7,296,815 B2 | 11/2007 | Ellsworth et al. | |
| 7,392,999 B2 | 7/2008 | O'Connor | |
| 7,494,146 B2 | 2/2009 | Tseng | |
| 7,556,276 B1* | 7/2009 | Dunlap | 280/284 |
| 7,581,743 B2 | 9/2009 | Graney | |
| 7,635,141 B2* | 12/2009 | O'Connor | 280/284 |
| 7,658,394 B1 | 2/2010 | Huang | |
| 7,661,503 B2 | 2/2010 | Weagle | |
| 7,712,757 B2 | 5/2010 | Berthold | |
| 7,717,212 B2 | 5/2010 | Weagle | |
| 7,828,314 B2 | 11/2010 | Weagle | |
| 7,934,739 B2 | 5/2011 | Domahidy | |
| 2001/0015540 A1* | 8/2001 | Lawwill et al. | 280/284 |
| 2003/0160421 A1* | 8/2003 | Assier | 280/283 |
| 2004/0046355 A1* | 3/2004 | Carroll | 280/284 |
| 2005/0057018 A1 | 3/2005 | Saiki | |
| 2005/0067806 A1* | 3/2005 | Weagle | 280/124.1 |
| 2005/0184483 A1 | 8/2005 | Buckley | |
| 2005/0285367 A1* | 12/2005 | Chang et al. | 280/284 |
| 2007/0024022 A1 | 2/2007 | Weagle | |
| 2007/0108725 A1* | 5/2007 | Graney | 280/284 |
| 2008/0054595 A1 | 3/2008 | Lu | |
| 2008/0067772 A1* | 3/2008 | Weagle | 280/124.134 |
| 2008/0073868 A1* | 3/2008 | Weagle | 280/124.1 |
| 2008/0217882 A1 | 9/2008 | Beaulieu et al. | |
| 2008/0238030 A1* | 10/2008 | Tseng | 280/284 |
| 2008/0252040 A1 | 10/2008 | Colegrove et al. | |
| 2008/0258425 A1 | 10/2008 | Tribotte | |
| 2008/0277900 A1* | 11/2008 | I | 280/283 |
| 2009/0026728 A1 | 1/2009 | Domahidy | |
| 2009/0072512 A1 | 3/2009 | Earle | |
| 2009/0261556 A1 | 10/2009 | Beale | |
| 2009/0261557 A1* | 10/2009 | Beale et al. | 280/284 |
| 2009/0283986 A1 | 11/2009 | Falke | |
| 2009/0315296 A1 | 12/2009 | Berthold | |
| 2010/0007113 A1 | 1/2010 | Earle et al. | |
| 2010/0059965 A1 | 3/2010 | Earle | |
| 2010/0102531 A1 | 4/2010 | Graney | |
| 2010/0109282 A1* | 5/2010 | Weagle | 280/284 |
| 2010/0127473 A1 | 5/2010 | Cocalis et al. | |
| 2010/0156066 A1 | 6/2010 | O'Connor | |
| 2010/0207342 A1* | 8/2010 | Weagle | 280/124.1 |
| 2010/0327556 A1 | 12/2010 | Chamberlain | |
| 2011/0018228 A1 | 1/2011 | Beale et al. | |
| 2011/0115181 A1 | 5/2011 | Weagle | |
| 2011/0187078 A1* | 8/2011 | Higgon | 280/284 |
| 2011/0193316 A1* | 8/2011 | Earle | 280/284 |
| 2011/0233892 A1* | 9/2011 | Domahidy | 280/284 |
| 2011/0233893 A1* | 9/2011 | Buckley | 280/284 |
| 2012/0074666 A1* | 3/2012 | Chamberlain | 280/284 |
| 2012/0228850 A1* | 9/2012 | Tseng | 280/283 |
| 2013/0093160 A1* | 4/2013 | Alsop | 280/284 |
| 2013/0214507 A1* | 8/2013 | O'Connor | 280/284 |
| 2013/0285346 A1* | 10/2013 | Wimmer | 280/284 |
| 2013/0341886 A1 | 12/2013 | Chamberlain | |
| 2014/0103617 A1 | 4/2014 | Chamberlain | |
| 2014/0197617 A1* | 7/2014 | Hoogendoorn et al. | 280/283 |
| 2014/0217697 A1 | 8/2014 | Buckley | |

OTHER PUBLICATIONS

Restriction Requirement from the U.S. Patent and Trademark Office for U.S. Appl. No. 14/005,177 (mailed Jun. 2, 2014).

Supplementary European Search Report for EP12757530 (mailed Aug. 14, 2014).

* cited by examiner

BICYCLE SUSPENSION SYSTEM

This application is a continuation in part of U.S. patent application Ser. No. 14/005,177 (which is the US national phase of PCT/CA2012/000236, international filing date: 14 Mar. 2012, US entry effected: 13 Sep. 2013), which claims the benefit of U.S. Provisional Patent Application No. 61/452, 423, Bicycle Suspension Systems, filed 14 Mar. 2011.

FIELD OF THE INVENTION

The present invention relates to bicycle suspension systems, namely rear suspension systems.

BACKGROUND OF THE INVENTION

A bicycle frame is the main component of a bicycle, on to which wheels and other components are fitted. The great majority of today's rigid-frame bicycles have a frame with upright seating. Such upright bicycles generally feature the so-called diamond frame, a truss consisting of two triangles: the front triangle and the rear triangle. In a conventional diamond frame, the front "triangle" is not actually a triangle because it consists of four tubes: the head tube, top tube, down tube and seat tube. The head tube contains the headset, the set of bearings that allows the front fork (which supports the front wheel) to turn smoothly for steering and balance. The top tube connects the head tube to the seat tube in the vicinity of the top of the seat tube, and the down tube connects the head tube to the bottom bracket. The bottom of the seat tube is also attached to the bottom bracket The rear triangle consists of the seat tube and paired chain stays and paired seat stays. The chain stays run roughly parallel to the chain, connecting the bottom bracket to the rear fork ends (which support the rear wheel). The seat stays connect the top of the seat tube (at or near the same point as the top tube) to the rear fork ends.

Many modern bicycles do not utilize a diamond frame, for example because: the frame is constructed in such a way that it does not consist of tubes attached one to another (for example, frames made of composite materials); or the frame involves a rear suspension system permitting rearward components of the bicycle (e.g., the rear wheel) to move relative to other components of the bicycle (e.g., the seat); or both. However, the terms used to describe the members of a conventional diamond frame (being, head tube, top tube, down tube, seat tube, chain stays and seat stays) are often used to describe analogous features on non-diamond frames and are at times so used herein.

Most bicycles use a chain to transmit power to the rear wheel. The drivetrain includes pedals which rotate the crank arms, which are attached to a spindle that rotates within the bottom bracket. With a chaindrive, a chainring attached to a crank arm drives the chain, which in turn rotates the rear wheel via a rear sprocket. The crank arms, chainrings and spindle are commonly referred to as the crankset. Most chaindrive systems have some form of gearing, typically comprising multiple rear sprockets of different sizes, multiple chainrings of different sizes and user controllable devices (referred to as derailleurs) for moving the chain between rear sprockets and between the chainrings, so as to selectively vary the gear ratio.

In chain drive systems, the portion of chain extending between the top of a chainring and the top of a rear sprocket conveys the motive force from the pedals to the rear wheels. When the rider is pedaling, this top portion of chain is under tension. In a bicycle without a rear suspension, this chain tension is resisted by the rigid frame (e.g., the rear triangle) to which the rear wheel is mounted.

In a bicycle with a rear suspension system, some portion of the force of such chain tension may be imparted to the suspension system. As well, movement of the rear suspension system relative to the bottom bracket may dynamically tension or slacken the portion of chain extending between the top of a chainring and the top of a rear sprocket, thereby affecting the pedaling resistance experienced by the rider. The direction of the force conveyed along the portion of chain extending between the top of a chainring and the top of a rear sprocket is referred to as the chain line. A further complication is that bicycles typically have multiple chainrings and multiple rear sprockets so as to provide rider selectable gear ratios; in the result, most bicycles do not have a single chain line, but rather have multiple chain lines.

A bicycle suspension is the system or systems used to suspend the rider and all or part of the bicycle in order to protect them from the roughness of the terrain over which they travel. Bicycle suspensions are used primarily on mountain bikes, but are also common on hybrid bicycles, and can even be found on some road bicycles. Bicycle suspension can be implemented in a variety of ways, including: front-fork suspension and rear suspension. It is not uncommon for a mountain bike to have front suspension but no rear suspension (such a suspension configuration is often referred to as a hardtail). However, it is uncommon for a mountain bike to have a rear suspension system but no front suspension system. Thus, rear suspension systems on mountain bikes are typically part of a full suspension system.

Suspension systems for mountain bikes first appeared in roughly the early 1990's. Over the ensuing years developers and users of mountain bike suspension systems recognized a variety of factors affecting suspension performance and general riding performance of suspension system, which factors are interrelated in dynamic and complex ways. It was soon realized that the fact that bicycles are powered by human effort means that effects on the drive train caused by suspension system movement that would, in the case of engine driven vehicles, be minor or unnoticeable, are significant in bicycles.

In the field of bicycle suspension systems, the following terms are generally used as follows:

Travel refers to how much movement a suspension mechanism allows. It usually measures how much the wheel axle moves.

Squat refers to rear suspension compression due to acceleration of the bicycle caused by rider pedaling (i.e., as opposed to gravity induced acceleration when coasting down an incline) and the resulting "weight transfer". Weight transfer occurs because the center of gravity of the bicycle and rider (typically located within the rider) is displace from the location where the acceleration force is applied (i.e., where the rear wheel contacts the riding surface). Thus, under powered acceleration, the rear wheel carries more weight (and the front wheel carries less weight) than if the bike was rolling at constant speed. If the bike has rear suspension, then the extra weight carried by the rear wheel (due to weight transfer) tends to cause the rear suspension to compress. Weight transfer is unavoidable during acceleration, and occurs equally with all suspended and non-suspended vehicles undergoing acceleration.

Pedal bob (also, kickback or monkey motion) refers to repeated squat and rebound with each pedal stroke.

Pedal bob reduces the efficiency of, or interferes with, a rider's pedal stroke—especially when climbing up steep hills.

Pedal feedback, or chainstay lengthening, refers to torque applied to the crankset by the chain caused by motion of the rear axle relative to the bottom bracket. Pedal feedback is caused by an increase in the distance between the top of the relevant chainring and the top of the relevant rear sprocket, and it can be felt by the rider as a torque on the crankset in the rotational direction opposite to forward pedaling.

Anti-squat refers to the tendency of suspension extension caused by pedaling (i.e., chainstay lengthening) to counteract the suspension compression that would otherwise result from weight transfer associated with the acceleration caused by the same pedaling. Anti-squat is generally given as a percentage, as follows: with 100% anti-squat the extension force caused by chain tension perfectly balances the compression force caused by weight transfer, and the suspension system doesn't extend or compress under pedaling-induced acceleration; and with 0% anti-squat the chain tension does not cause any extension or compression force in the suspension, and the suspension system will compress under acceleration, due to weight transfer alone. A generally accepted approach for quantifying anti-squat is as described in 'Motorcycle Handling and Chassis Design: the art and science' (Tony Foale, 2006) and in U.S. Pat. No. 7,128,329. Some anti-squat is generally considered to be desirable. However, too much anti-squat results in resistance to compression of the suspension due to pedal forces when the rear wheel hits an obstacle. Likewise, bump forces are transmitted through the pedals to the rider. In other words, too much chainstay lengthening either reduces the ability of the suspension to react to irregular terrain, or is felt by the rider as movement of the pedals.

Sag refers to the amount of suspension movement under just the static load of the rider. Sag is often used as one parameter when tuning a suspension for a rider. Preload is adjusted until the desired amount of sag is achieved. Nearly all rear suspension systems operate optimally with sag set somewhere between 20-35% of the total suspension travel, depending on the rider's preference and the suspension design. Some sag is considered to be desirable in that it allows the rear wheel to drop into depressions in the terrain, maintaining traction.

Preload refers to the force applied to spring component before external loads, such as rider weight, are applied. The desirable amount of preload is affected by the rider weight and the parameters of the spring components. Preload affects sag; increasing preload reduces sag and decreasing preload increases sag. Thus, adjusting preload affects the ride height of the suspension.

Rebound refers to the rate at which a suspension component returns to its original configuration after absorbing a shock. The term is also generally used to refer to rebound damping, or rebound damping adjustments on shocks, which vary the rebound speed. More rebound damping will cause the shock to return at a slower rate.

Lockout refers to a mechanism to disable a suspension system so as to make it substantially rigid. This may be desirable during climbing or sprinting to prevent the suspension from absorbing power applied by the rider. Some lockout mechanisms also feature a "blow off" system that deactivates the lockout when an appropriate force is applied to help prevent damage to the shock and rider injury under high unexpected loads.

Compression damping refers to a feature that slows the rate of compression in a front fork shock or rear shock. Compression damping is usually accomplished by forcing a hydraulic fluid (such as oil) through a valve when the shock becomes loaded. The amount of damping is determined by the resistance through the valve, a higher amount of damping resulting from greater resistance in the valve. Many shocks have compression damping adjustments which vary the resistance in the valve. Often, lockout is achieved by a compression damping valve that can be adjusted to prevent flow of any hydraulic fluid through the compression damping valve.

Unsprung mass is the mass of the portions of bicycles that are not supported by the suspension systems. For example, in a bicycle with rear and front suspensions, the wheels comprise part of the unsprung mass.

Input from hard braking often also negatively affected the performance of early full suspension designs. When a rider firmly applied the brakes (which often occurs in terrain situations in which the rear suspension is needed most), some early suspension configurations tended to extend the shock (known as brake jack), causing a stiffening of the suspension, which tends to not allow the suspension to react to bumps very well. Alternatively, some suspension designs exhibit brake squat, where braking forces tend to compress the suspension. This effect, in moderation, can be beneficial to counteract the normal forward weight transfer caused by braking.

As illustrated in the following discussion of some types of prior-art suspensions, rear suspension systems involve complicated interactions of multiple connected components and multiple performance considerations.

One of the simplest and most common bicycle suspension designs is the single-pivot system, in which the rear wheel of the bicycle is attached to the main frame of the bicycle by a single swingarm (often a generally triangular component and often referred to as the rear triangle) pivoting about a pivot located on the main triangle. In simple terms, a lower forward corner of the rear triangle is pivotally attached to the main frame, a lower rearward corner houses the rear wheel axle, and the third upward corner actuates a shock absorber interposed between the third upward corner and the main frame. The pivotal attachment between the rear triangle and the main frame is typically located above the bottom bracket shell. With the single-pivot design, the rear wheel absorbs bumps from irregular terrain by moving in a simple curve (i.e., a circular arc) about the pivot.

With single-pivot suspensions, pedaling forces tend to extend or compress the rear suspension, depending on whether the pivotal attachment between the rear triangle and the main frame is above or below the chain line. Likewise, when a single-pivot suspension system compresses when hitting an obstacle on the trail, or extends when riding over a depression in the ground surface, unwanted forces are exerted on the bicycle riders legs via the pedals. In single-pivot designs in which the pivot is below the chain line, pedaling induced chain tension translates into a force tending to pull the swingarm upwards (i.e., tending to compress the suspension); and by the same token, terrain-induced compression and extension of the suspension tend to dynamically affect chain tension, with compression decreasing chain tension and extension increasing chain tension (i.e., chainstay lengthening), both of which affect the pedaling resistance experienced by the rider. By contrast, in single-pivot designs in which the pivot is above the chain line, pedaling induced chain tension translates into a force tending to pull the swingarm downwards (i.e., tending to extend the suspension); and, again, terrain-induced compression and extension of the suspension tend to dynamically affect chain tension, with compression increasing chain tension and extension decreasing chain tension, both of which again affect the pedaling resistance experienced by the rider.

Generally, the greater the amount of suspension system travel in a single-pivot suspension, the greater these pedaling-induced and terrain-induced effects. Configuring a single-pivot suspension so as to provide a desirable amount of chainstay lengthening (i.e., anti-squat for efficient pedaling), results in too much chainstay lengthening when the suspension system is fully compressed. Lowering the pivot to reduce the total amount of chainstay lengthening when the suspension is fully compressed results in power loss when pedaling, because pedaling forces act to compress the suspension. Shock absorber damping was introduced to reduce the suspension motion induced by pedaling forces. However, shock damping may resist unwanted movement of a suspension, but damping also reduces the ability of the suspension to absorb bumps. Therefore, typically with single-pivot suspension systems, some of the rider's energy is undesirably expended in compressing or extending the suspension, the effectiveness of the suspension is reduced by damping on the shock, and some amount of the rider's energy is dissipated in the shock absorber.

More complicated suspension designs were developed in an attempt to overcome some or all of the single-pivot systems' performance shortcomings. All such suspension systems use a configuration of linkages that is more complicated than a mere single pivot and that generally provide for an axle path of travel during suspension compression and extension that is other than the simple curve about the pivot point achievable typical of single-pivot suspensions.

A popular linkage suspension design is shown in FIG. 3 in U.S. Pat. No. 5,899,480 (commonly referred to as a Horst Link suspension system after the inventor, Horst Leitner). The Horst Link suspension system comprises four pivotally connected linkage members. The first linkage member is the front triangle of the bicycle. The second linkage member is a long swingarm similar to a single pivot's swingarm (i.e., analogous to a chainstay). The third linkage member is analogous to seatstays. The fourth linkage member is located between the third linkage member (i.e., the seatstays) and the first linkage member (i.e., the front triangle). The rear wheel is mounted at the lower end of the seatstays The Horst Link suspension is intended to reduce the amount by which pedaling forces actuate the suspension (and likewise reduce feedback from suspension movement to the pedals) by distributing pedaling forces across both the lower swingarm and the third linkage member.

However, to achieve this goal, the chainstay/swingarm pivot on the front triangle is typically located lower and closer to the bottom bracket, as compared to single-pivot suspension systems. It's in this location to take advantage of the fact that since pedaling forces affect suspension movement less, a low main pivot location does not result in pedal forces compressing the suspension system as much as in single pivot locations. This allows the suspension to move more freely when pedaling forces are applied, and likewise results in less feedback to the rider's legs when the suspension is compressed. These effects are a result of the low main pivot location, which reduces the amount of chainstay lengthening. If a higher main pivot location is employed to achieve an advantageous amount of chainstay lengthening, the path of the rear axle is up and away from the bottom bracket as in single-pivot suspension systems, resulting in too much chainstay lengthening when the suspension is fully compressed.

Because typical Horst Link suspension systems are designed to reduce pedaling effects on the suspension, they generally do not provide the benefit associated with chainstay lengthening (i.e., anti-squat). Since suspension stiffening byway of chainstay lengthening is minimal or non-existent, the acceleration-induced weight shift of the rider toward the rear of the bicycle compresses the rear suspension, resulting in loss of the rider's energy. In practice, many Horst Link suspension designs use a shock absorber with damping to reduce compression of the suspension due to acceleration forces, reducing the ability of the suspension to react to bumps or depressions in the trail.

Dual short-link designs are a popular type of four-bar linkage suspension systems comprising two short links interposed between the bicycle main frame and a rigid rear triangle to which the rear wheel is mounted. A characteristic of dual short-link designs is that they use the relatively high angular velocity of the short links to manipulate the path of the rear axle during suspension compression and extension. However, the relatively high angular velocity of the short links also tends to induce rapid rates of change in the shock leverage ratio. This means that the shock is compressed at varying rates while the rear wheel moves at a constant rate. This discontinuity complicates suspension design; if the rate of change of leverage ratio is too rapid, or the difference between the highest and lowest leverage ratio is large, suspension performance suffers.

To compensate for rapidly changing leverage rates, dual short-link designs are typically configured to provide: a specific amount of sag when the suspension is statically loaded, and a shock absorber finely tuned to match the rear suspension's leverage ratio changes. If sag is not set correctly on dual short-link suspension bikes, the shock absorber is "out of tune" with the leverage ratio applied by the dual short links, and the suspension will not operate optimally. Part of that "tuning" can include not using the first third of suspension travel during the compression stroke, which avoids one part of the rapidly changing leverage rate applied to the shock absorber. By ignoring the first third of the suspension travel, suspension designers can "hide" poorly performing parts of the shock leverage ratio curve, where it is thought by some to have minimal adverse effects on suspension travel.

Dual short-link bikes often do not use sag to full advantage. In practice, many riders cannot or do not set a desirable sag, resulting in sub-optimal performance of the dual short link suspension.

The first widely successful dual short link design is called the Virtual Pivot Point suspension (or VPP), disclosed in U.S. Pat. No. 6,206,397. This suspension system employs two short linkages that move in "opposite directions" so as to manipulate the rear wheel axle path into an S-curve. This design uses chain tension to "hold" the rear axle at its sag point, or the point where the chainstays are at their "shortest length". Chainstay lengthening occurs both above and below the sag point. As a result, in the VPP design, chain tension impedes suspension extension and thus impedes the rear wheel from dropping into depressions in the terrain, which may adversely affect traction of the rear wheel over irregular terrain.

A dual short link design that employs links pivoting in the same direction is disclosed in U.S. Pat. No. 7,128,329 (Weagle). This design uses anti-squat properties generated by large amounts of chainstay lengthening to counteract the rearward weight shift and resulting compression of the suspension due to acceleration forces. By focusing on anti-squat behavior throughout the suspension travel, this design essentially has an up and rearward axle path through the majority of its travel. This causes chainstay lengthening throughout most of the travel, resulting in chain growth's associated problems, similar to high-pivot single-pivot designs.

Many of the patented dual short link suspension designs featuring two short links rotating in the same direction emulate the function of Weagle's or the VPP designs in various ways, but differ with respect to the placement, length and pivot locations of the two short links. The chainstay lengthening effects are derived from the placement of the links and pivot points. However, by emulating Weagle's or the VPP design, the majority of dual short-link designs have similar performance issues as single pivot designs, relying on a specific amount of suspension sag, not taking full advantage of suspension sag, and highly variable shock leverage ratios.

A suspension design that illustrates the variety of performance considerations that influence innovation in the field of bicycle rear suspensions is the design described in U.S. Pat. No. 7,556,276 (Dunlap), which is directed to performance considerations completely different from those discussed above (e.g., chainstay lengthening, anti-squat etc.). As set out in the Summary of Invention section of the Dunlap patent, the Dunlap design is primarily aimed at lowering the center of gravity of the bicycle and providing a skid plate that helps to actuate the rear wheel.

Approaches to dealing with chainstay lenghtening include the use of an idler wheel. For example, in UK Patent Application GB 2,454,021 (McGrath), the disclosed suspension produces significant undesirable chainstay lengthening, such that an additional component, essentially an idler wheel, is a preferred part of the system. The partial paragraph at the top of page 5 of McGrath reads in part: "Preferably a pivot jockey assembly 41, would be mounted to the main frame to prevent chain derailement and to minimise the effects of the increasing length of the chain stay 70, (as shown in FIG. 2) when moving through its travel."

SUMMARY OF THE INVENTION

The present invention relates to rear suspension embodiments for bicycles configured to provide an over center anti-squat effect. Embodiments may be configured to provide the over center anti-squat effect for all gear combinations or for a portion of the available gear combinations (e.g., for gears above a specified chain line defined by a design chain ring).

Embodiments also include configurations in which the instant center of the chain stay member is located so as to reduce non-acceleration pedal bob.

In one aspect, the present invention provides a bicycle suspension system for attaching a rear wheel with a rear wheel axis of rotation and one or more different sized sprockets, to a bicycle frame having a right side, being on the right hand side when the bicycle frame is viewed from the rear, and having a bottom bracket with a bottom bracket axis of rotation, a pair of crank arms and one or more different sized chain rings, the one or more sprockets and the one or more chainrings defining at least one chain line, being the line defined by a chain under tension between the top of a sprocket and the top of a chain ring, the suspension system including:

a seat stay member that in use is pivotally attached to a bicycle frame at a seat stay-frame pivot having a seat stay-frame pivot axis;

a link member that in use is attached to the bicycle frame at a link-frame pivot having link-frame pivot axis;

a chain stay member having a wheel mount suitable for receiving a rear wheel axle and defining a rear wheel axis of rotation, wherein, in use:

the chain stay member is pivotally coupled to the seat stay member at a seat stay-chain stay couple having a seat stay-chain stay couple pivot axis located upward of the rear wheel axis of rotation; and the chain stay member is pivotally coupled to the link member at a link-chain stay couple having a link-chain stay couple pivot axis;

a shock absorber device that in use is directly or indirectly interconnected between two of the seat stay member, link member, the chain stay and the bicycle frame, for resiliently impeding relative movement of the components from an at-rest position;

wherein, with the suspension system at a desired sag and the bicycle supported on a horizontal surface, the angle above the horizontal of a line passing through the seat stay-frame pivot axis and the link-frame pivot axis is less than or about equal to the angle above the horizontal of at least one of the one or more chain lines.

With the suspension system at the desired sag and the bicycle supported on a horizontal surface, the angle above the horizontal of a line passing through the seat stay-frame pivot axis and the link-frame pivot axis may be less than the angle above the horizontal of a chain line defined by the largest chain ring and the smallest sprocket.

With the suspension system at the desired sag and the bicycle supported on a horizontal surface, the angle above the horizontal of a line passing through the seat stay-frame pivot axis and the link-frame pivot axis may be less than the angle above the horizontal of a chain line defined by a design chain ring and the smallest sprocket.

With the suspension system at the desired sag and the bicycle supported on a horizontal surface, the seat stay-chain stay couple pivot axis may be above a chain line defined by a design chain ring and the smallest sprocket.

With the suspension system at the desired sag and the bicycle supported on a horizontal surface, the seat stay-chain stay couple pivot axis may be below a chain line defined by a design chain ring and the smallest sprocket.

The distance between the link-frame pivot axis and the link-chain stay couple pivot axis may be less than the distance between the link-chain stay couple pivot axis and the rear wheel axis of rotation.

During movement of the suspension system from extension to compression, when viewed from the right side, the link member may pivot relative to the bicycle frame in a clockwise direction.

In terms of an X,Y coordinate system with the X axis parallel to an imaginary flat surface supporting both wheels of the bicycle with the bicycle not loaded and with the intersection of the X axis and Y axis aligned with the bottom bracket axis of rotation, the coordinates may be about as follows:
rear wheel axis of rotation: −437 mm, 12 mm
seat stay-frame pivot axis: 78.5 mm, 56.6 mm
link-frame pivot axis: −6.7 mm, 53.4 mm
link-chain stay couple pivot axis: −39.4 mm, 25.1 mm
seat stay-chain stay couple pivot axis: −361.9 mm, 93.3 mm In terms of an X,Y coordinate system with the X axis parallel to an imaginary flat surface supporting both wheels of the bicycle with the bicycle not loaded and with the intersection of the X axis and Y axis aligned with the bottom bracket axis of rotation, the coordinates may be about as follows:
rear wheel axis of rotation: −437 mm, 12 mm
seat stay-frame pivot axis: 74.2 mm, 60.5 mm
link-frame pivot axis: −6.1 mm, 44.3 mm
link-chain stay couple pivot axis: −54.4 mm, 8.8 mm
seat stay-chain stay couple pivot axis: −389.5 mm, 106.3 mm During movement of the suspension system from extension to compression, when viewed from the right side, the link member may pivot relative to the bicycle frame in a counter-clockwise direction.

In terms of an X,Y coordinate system with the X axis parallel to an imaginary flat surface supporting both wheels of the bicycle with the bicycle not loaded and with the intersection of the X axis and Y axis aligned with the bottom bracket axis of rotation, the coordinates may be about as follows:
  rear wheel axis of rotation: −437 mm, 12 mm
  seat stay-frame pivot axis: 72 mm, 58.4 mm
  link-frame pivot axis: −35.4 mm, 55.4 mm
  link-chain stay couple pivot axis: 9.2 mm, 67.3 mm
  seat stay-chain stay couple pivot axis: −403.2 mm, 78.3 mm In terms of an X,Y coordinate system with the X axis parallel to an imaginary flat surface supporting both wheels of the bicycle with the bicycle not loaded and with the intersection of the X axis and Y axis aligned with the bottom bracket axis of rotation, the coordinates may be about as follows:
  rear wheel axis of rotation: −437 mm, 12 mm
  seat stay-frame pivot axis: 72.2 mm, 65.3 mm
  link-frame pivot axis: −37.2 mm, 45.2 mm
  link-chain stay couple pivot axis: −5.3 mm, 49.1 mm
  seat stay-chain stay couple pivot axis: −357.9 mm, 79.4 mm In terms of an X,Y coordinate system with the X axis parallel to an imaginary flat surface supporting both wheels of the bicycle with the bicycle not loaded and with the intersection of the X axis and Y axis aligned with the bottom bracket axis of rotation, the coordinates may be about as follows:
  rear wheel axis of rotation: −437 mm, 12 mm
  seat stay-frame pivot axis: 44.2 mm, 30.4 mm
  link-frame pivot axis: −43.1 mm, 54.1 mm
  link-chain stay couple pivot axis: −0.5 mm, 71.6 mm
  seat stay-chain stay couple pivot axis: −377.8 mm, 87.9 mm Movement of the chain stay member relative to the bicycle frame, during suspension compression and extension, may define an instant center wherein with the suspension system at the desired sag the instant center is at a position between vertical alignment with the axis of rotation of the bottom bracket and vertical alignment of a location forward of the axis of rotation of the bottom bracket about ¾ the length of the crank arm.

The instant center may be at a position between vertical alignment with the axis of rotation of the bottom bracket and vertical alignment of a location forward of the axis of rotation of the bottom bracket about ½ the length of the crank arm. The instant center may be at a position forward of the axis of rotation of the bottom bracket about ⅓ the length of the crank arm.

With the suspension system at a desired sag and the bicycle supported on a horizontal surface, the angle above the horizontal of a line passing through the seat stay-frame pivot axis and the link-frame pivot axis may be less than the angle above the horizontal of at least one of the one or more chain lines.

The shock absorber device may be interconnected between the seat stay member and the bicycle frame.

In another aspect, the present invention provides a bicycle comprising the suspension system.

DETAILED DESCRIPTION WITH REFERENCE TO THE DRAWINGS

Figure 1:
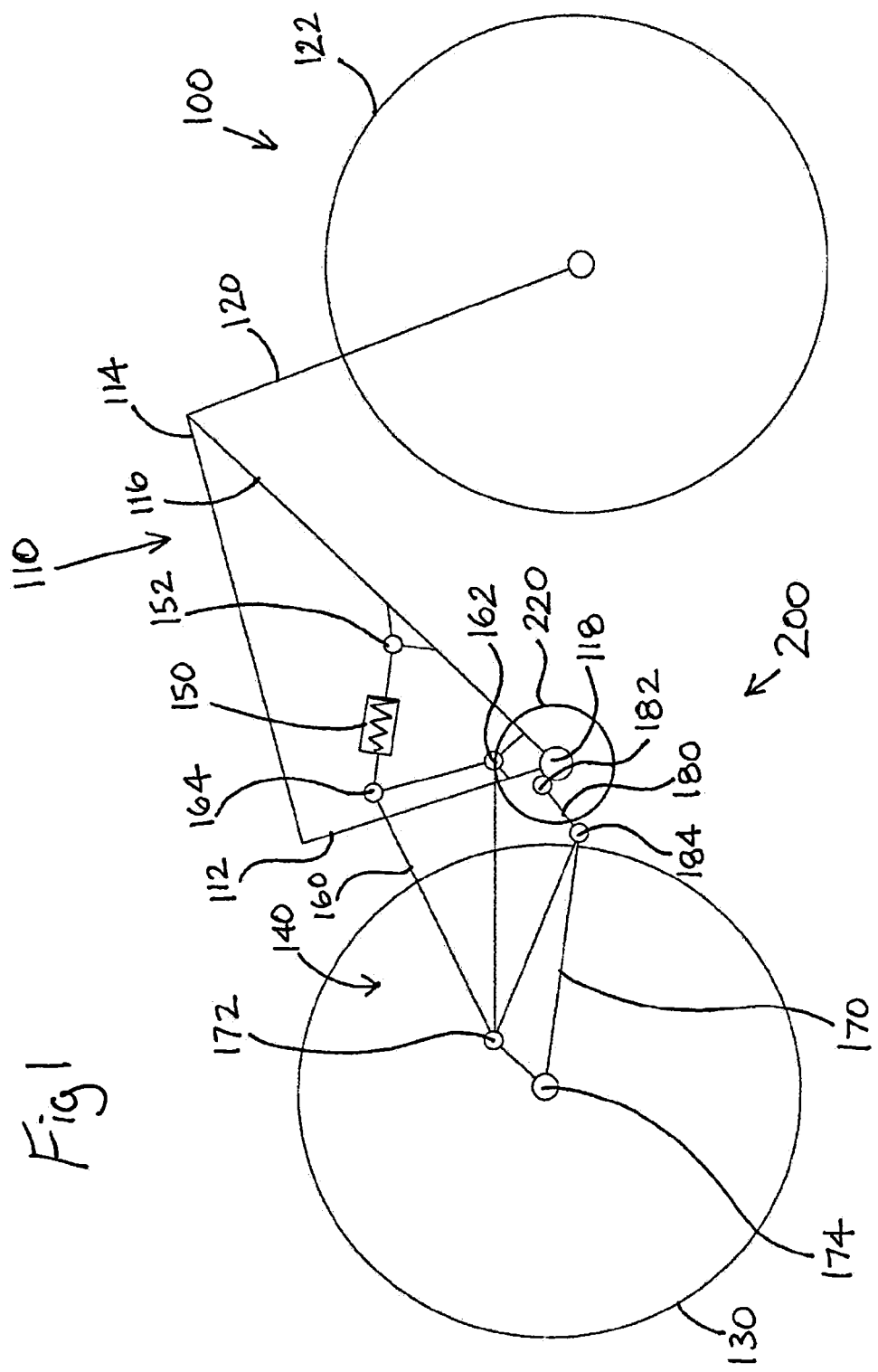
FIG. 1 is a schematic right-side elevation view of a stylized embodiment of the present invention with the pivot locations spread apart to assist in visualization of the components, having a link with the link in the clockwise pivoting configuration, shown in the un-loaded "at rest" position.

In the drawings, bicycle embodiments of the present invention are shown viewed from the right side. Related to this, movement of components is generally described herein as if viewed from the right side of the bicycle, for example, pivotal movement is at times described as "clockwise" or "counter-clockwise".

In the drawings, the schematic representations of the bicycle embodiments of the present invention show conventional bicycle features in a simplified manner that for current purposes ignores the possible variations in configurations and details of these features. For example, some of the schematic drawings do not indicate a feature corresponding to a head tube. Further, it is well known that modern materials permit frame configurations considerably different from a simple "triangle" composed of tubes, suggested by the schematic representations.

In the drawings, there is shown a bicycle 100 including a frame 110. The frame 110 is schematically represented as having a seat tube 112, a top tube 114 and a down tube 116. A bottom bracket 118 is located at the juncture of the seat tube 112 and the down tube 116. A chainring 220 is mounted at the bottom bracket 118. Crank arms 126 (left side crank arm not shown in the drawings) are also mounted at the bottom bracket 118. Mounted to the frame 110 there are front forks 120, to which the front wheel 122 is mounted. The bicycle 100 includes a rear wheel 130, attached to the frame 110 via a rear suspension system 140 embodiment of the present invention.

The rear suspension system 140 includes: a shock absorber 150, mounted at its proximal end to the frame 110 at the frame-shock mount 152; a seat stay member 160, pivotally mounted to the frame 110 at the seat stay-frame pivot 162 and coupled to the shock absorber 150 at the seat stay-shock couple 164; a chain stay member 170, coupled to the seat stay member 160 at the seat stay-chain stay couple 172 and including a rear axle mount 174 at which the rear wheel 130 is attached; and a link 180, pivotally mounted to the frame 110 at the link-frame pivot 182 and coupled to the chain stay member 170 at the link-chain stay couple 184.

In general terms the embodiments of the present invention shown in the drawings include two configurations for the link 180: a clockwise pivoting configuration 200 (as shown for example in FIGS. 1, 5 and 8) in which the link 180 pivots relative to the frame 110 in a clockwise direction as the suspension is compressed; and a counter-clockwise pivoting configuration 210 (as shown for example in FIGS. 3 and 10) in which the link 180 pivots relative to the frame 110 in a counter-clockwise direction as the suspension is compressed.

The location and movement of the instant center is a consideration in the current suspension system embodiments. The term instant center, also called the instantaneous center or instant center of rotation, is used to refer to the point around which all points in a body undergoing planar movement that is neither a pure displacement (i.e., not merely linear) nor a pure rotation (i.e., not merely rotation about a fixed center), are rotating at a specific instant of time. As the planar movement is not a pure rotation, there is a different instant center for each instant in time/position of the body. The different instant centers define a curve, referred to as the moving centrode.

In the suspension system of the current application, the instant center (IC) 230 of the chain stay member 170 and its path of movement can readily be visualized from the seat stay member 160 and the link 180. The instant center 230 is located at the intersection of an imaginary straight line passing through the pivot axis seat stay-chain stay couple 172 and the pivot axis of the seat stay-frame pivot 162, and an imaginary straight line passing through the pivot axis of the link-frame pivot 182 and the pivot axis of the link-chain stay couple 184.

As the chain stay member 170 is subject to constrained reciprocating movement relative to the frame 100, the movement of the instant center 230 follows a constrained reciprocating path.

As indicated above, the direction of the force conveyed along the portion of chain extending between the top of a chainring and the top of a rear sprocket is referred to as the chain line. Bicycles typically have multiple chainrings and multiple rear sprockets so as to provide rider selectable gear ratios. Thus, most bicycles do not have a single chain line, but rather have multiple chain lines. It is conventional in the design of bicycle rear suspension systems to identify a design chainring (DC) and in some cases, more specifically, a design chain line, for which one or more defined desired performance characteristics are intended to be optimized. For example, typically, with conventional anti-squat, the design chainring is the chainring that results in the desired conventional anti-squat (i.e., usually approximately 100% anti-squat) when the suspension system is at the desired sag.

Applicant understands that suspension system configurations described herein provide anti-squat derived from an over center effect (referred to herein at times as over center anti-squat) that is distinguishable from the anti-squat conventionally understood to be provided by the effect of chain tension on the components of the suspension system as a whole (referred to herein at times as conventional anti-squat). Put simply, it is understood that conventional anti-squat employs chain tension to "lift" the rider against the force of gravity (dependent on rear axle path, chain tension force vector, height of the rider's center of gravity and wheel contact points), whereas over center anti-squat employs chain tension to restrict the movement of the suspension components relative to each other.

The term "over center" is generally used with respect to an assembly including a component for applying tension (e.g., a spring) attached between components of a pivoting structure and positioned to translate across the pivot point as the pivoting structure pivots. In conventional over center assemblies, a spring is used to provide a biasing force to a pivoting component in one direction while on a first side of the pivot point, the biasing force dropping to zero as the string translates across the pivot point, and the biasing force increasing on the pivoting member in the opposite direction when the spring is on a second side of the pivot point.

It is understood that the over center effect in the present invention is dependent on the relative orientation at the sag point, of the chain line 222 (and thus the chain force vector) and the suspension mount line 250, being an imaginary line passing through the pivot axis of the seat stay-frame pivot 162 and the pivot axis of the link-frame pivot 182.

The over center effect occurs when the angle above horizontal that is defined by the chain line 222 is greater than the angle above horizontal of the suspension mount line 250. It is understood that when the angle above horizontal of the chain line 222 is larger than the angle above horizontal of the suspension mount line 250, chain tension will tend to cause the suspension to extend, creating the over center anti-squat effect. In other words, for the over center effect, the angle above the horizontal of the suspension mount line 250 is smaller than the angle above the horizontal of the chain line 222. It has been noted that suspension efficiency gains arise as the suspension approaches over center, i.e., when it is close to "on center". Thus, it is understood that desired anti-squat (and thus improved general suspension performance) may be obtained with a suspension configuration and gear arrangement that provides at least one or more gear combinations in which the angle above horizontal of the chain line 222 is larger than or roughly equal to the angle above horizontal of the suspension mount line 250.

Applicant understands that the horizontal distance between the seat stay-frame pivot 162 and the link-frame pivot 182 affects the amount of over center anti-squat, because this horizontal affects the leverage that the rear suspension has on the bicycle frame. The greater the horizontal distance between the seat stay-frame pivot 162 and the link-frame pivot 182, the greater the leverage imparted by the over center anti-squat onto the main triangle. This effect is analogous to holding a long pole with both hands touching at the centre of the pole, as compared to holding the same pole with hands spread. More leverage may be exerted on the pole with hands spread.

Some suspension embodiments of the present invention are configured to provide over center anti-squat when the rider chooses a chain ring that is larger than the design chain ring. The greater the difference in angle, the greater the over center effect. Thus, the amount of over center anti-squat resistance can be "tuned" by adjusting the angle difference.

Figure 5:
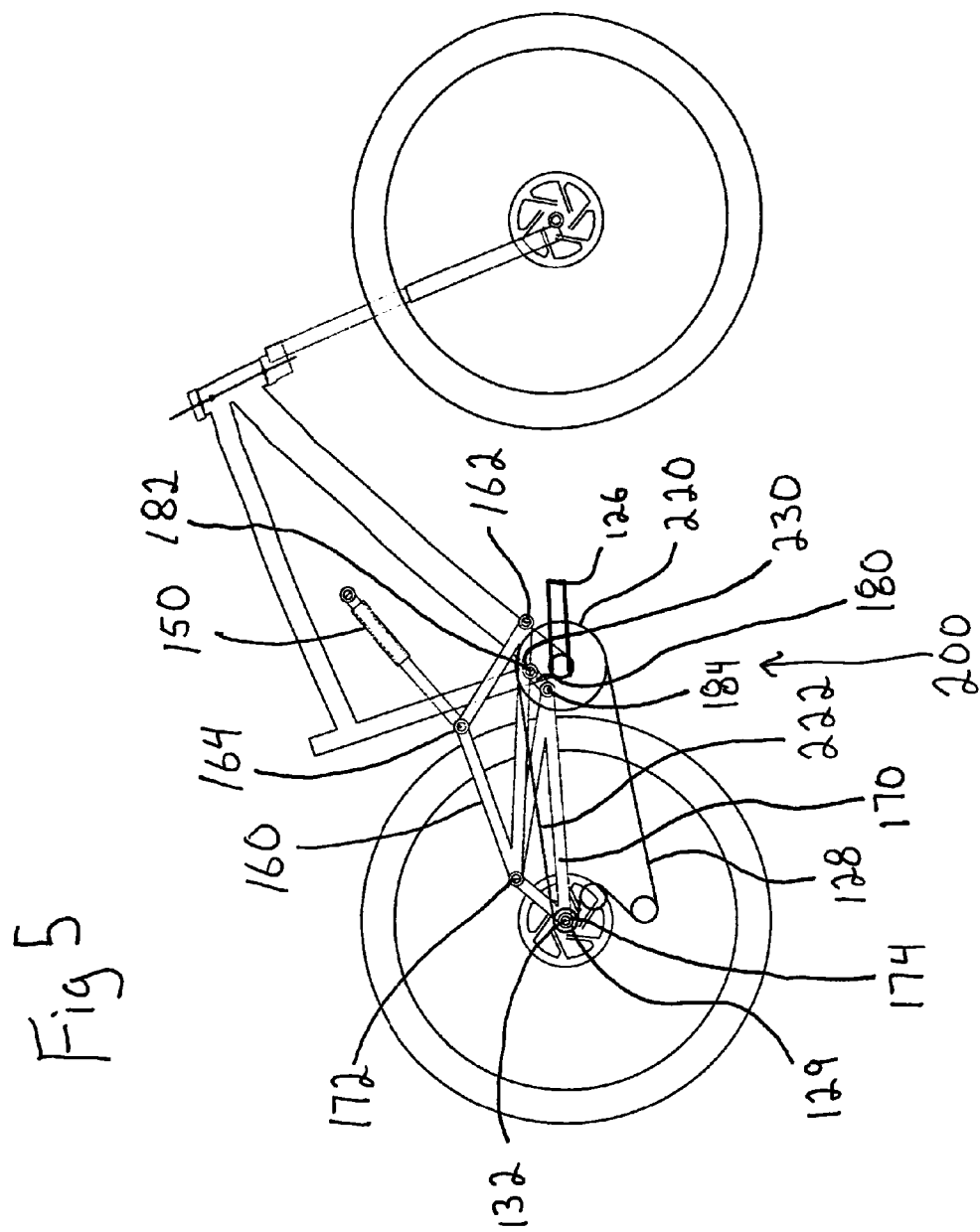
FIG. 5 is a schematic right-side elevation view of a first exemplary embodiment of the present invention having a link with the link in the clockwise pivoting configuration, shown in the un-loaded "at rest" position.
Figure 6:
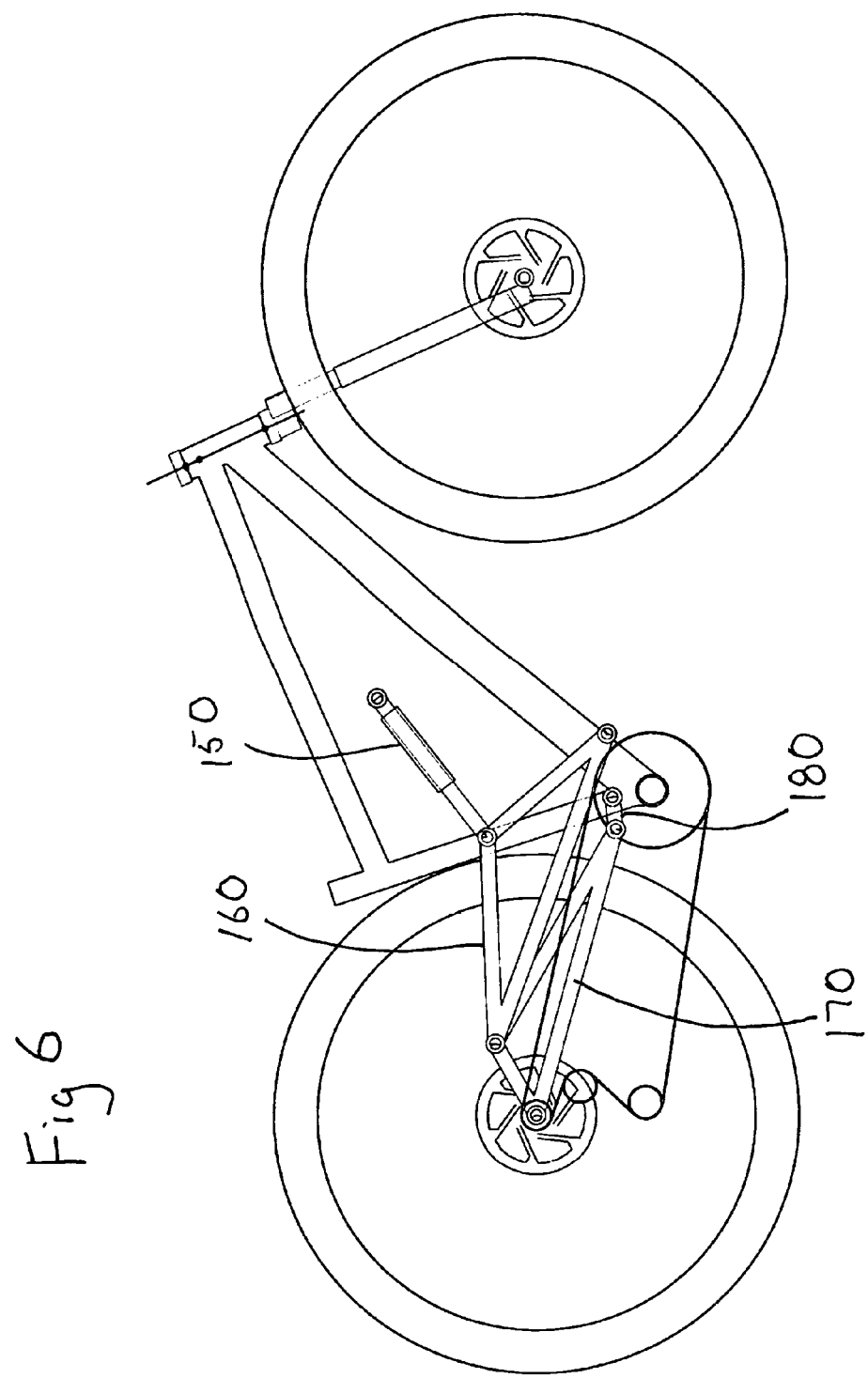
FIG. 6 is a schematic right-side elevation view of the embodiment of FIG. 5, shown in a compressed position.
Figure 7:
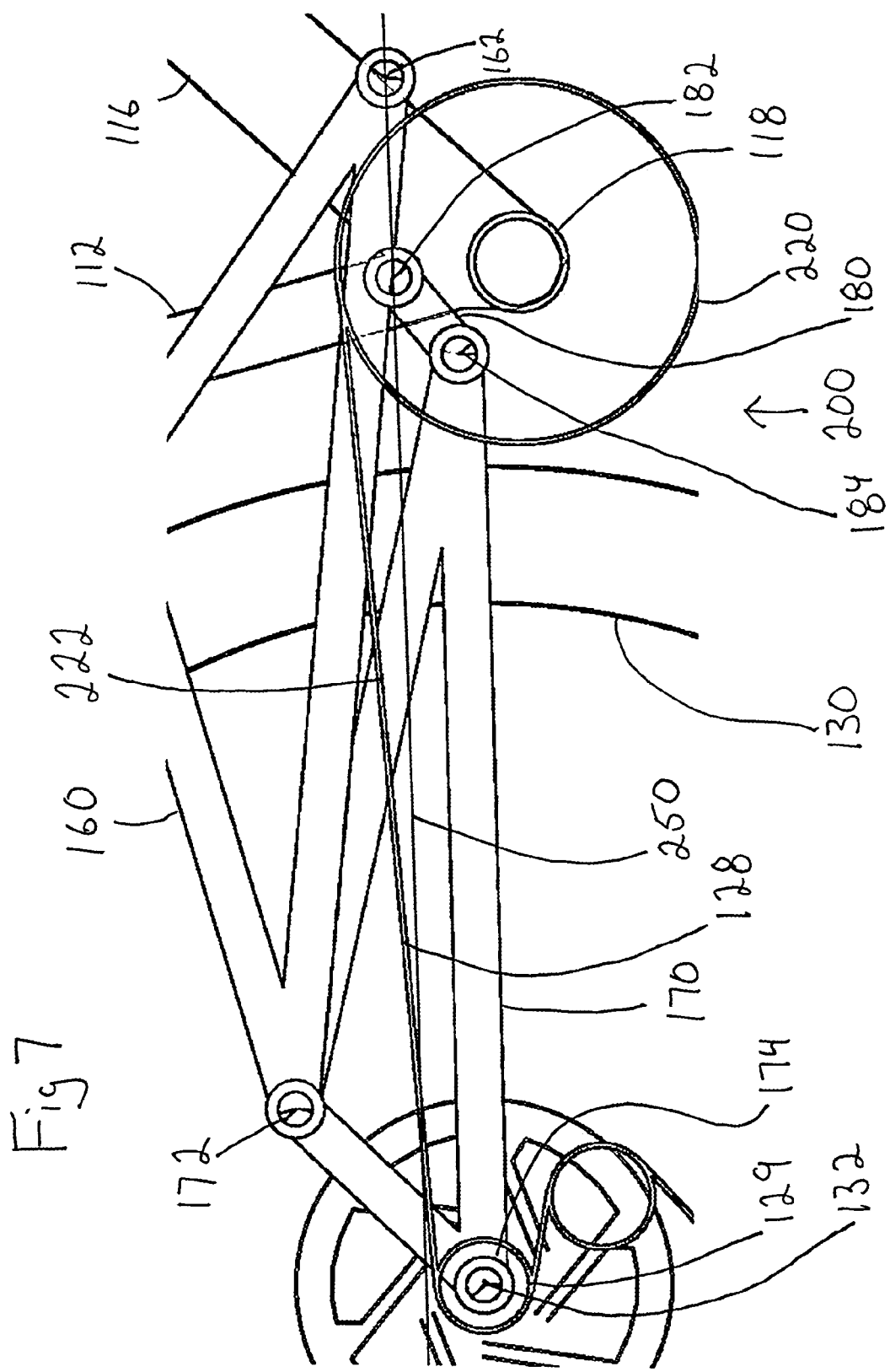
FIG. 7 is an enlarged isolation view of view of the embodiment of FIG. 5 illustrating the chain line and suspension mount line.
Figure 10:
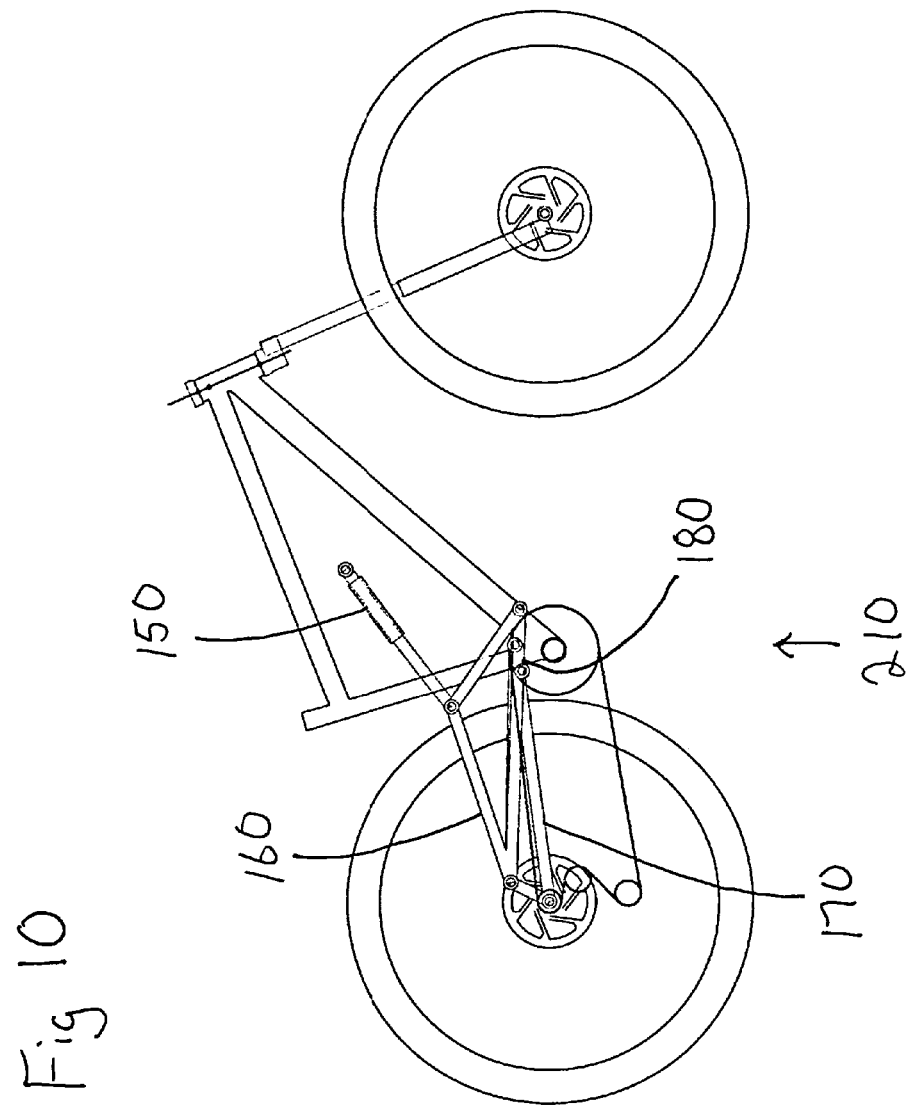
FIG. 10 is a schematic right-side elevation view of an exemplary embodiment of the present invention having a link with the link in the counter-clockwise pivoting configuration, shown in the un-loaded "at rest" position.
Figure 11:
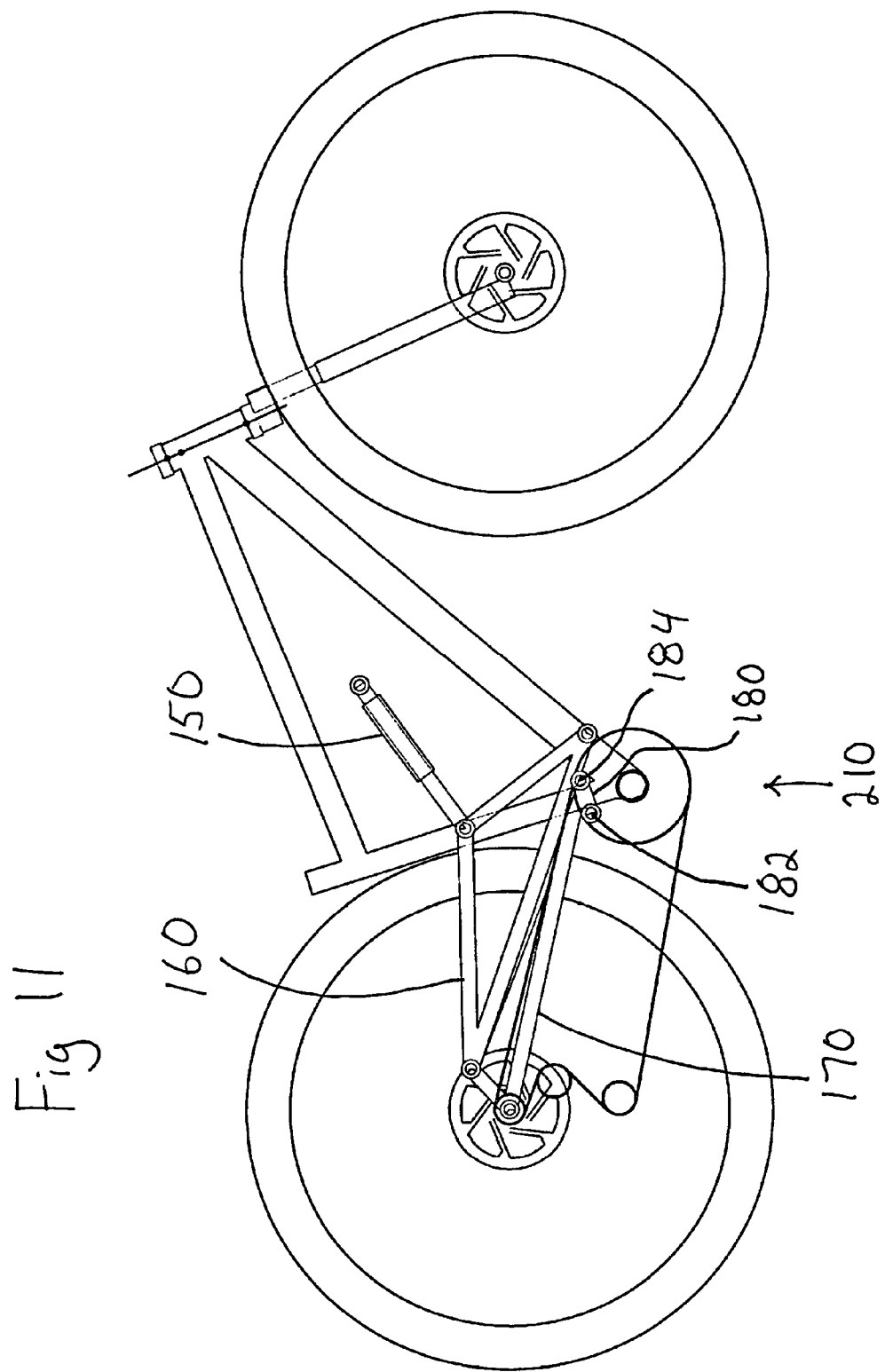
FIG. 11 is a schematic right-side elevation view of the embodiment of FIG. 10, shown in a compressed position.
Figure 12:
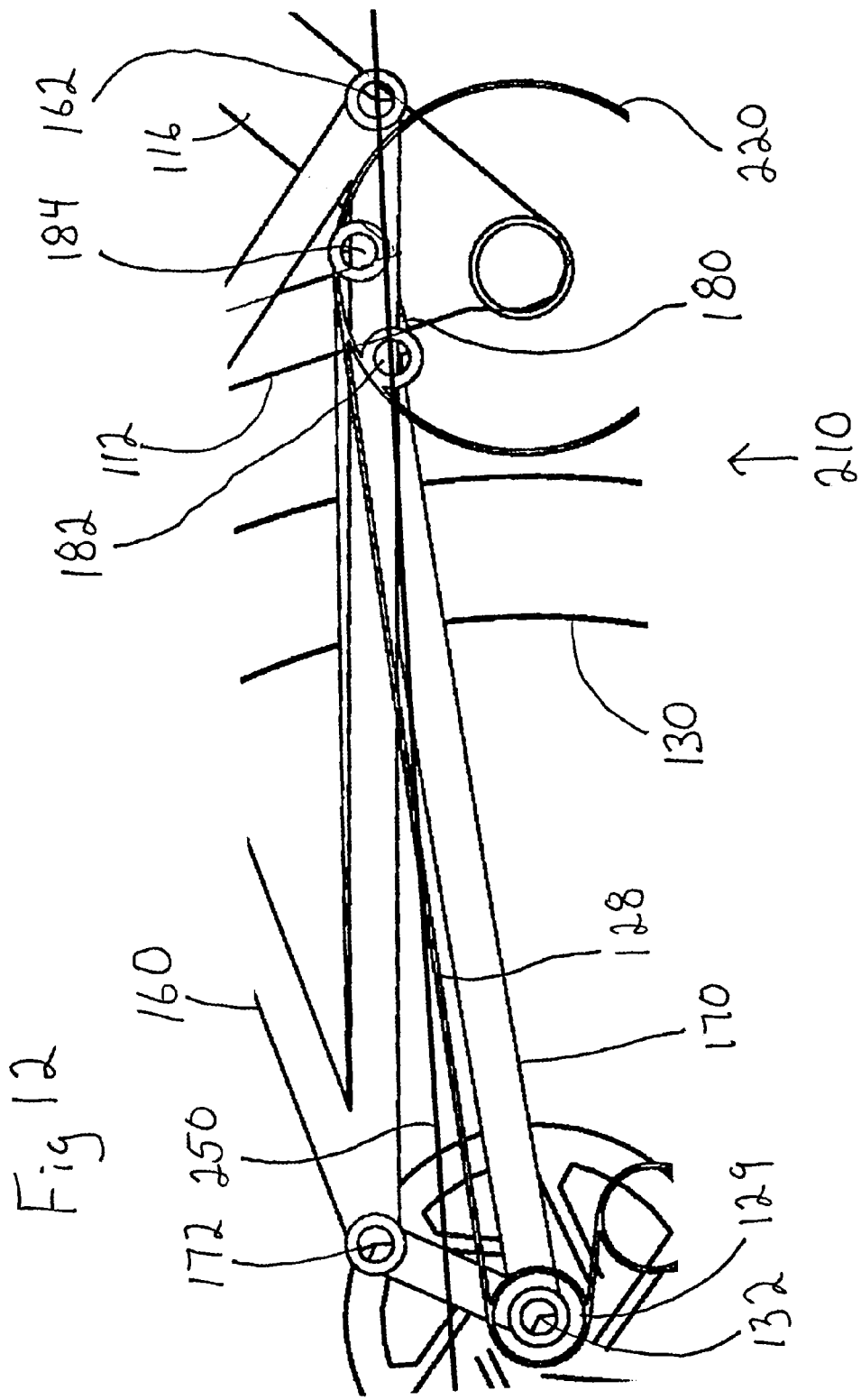
FIG. 12 is a enlarged isolation view of view of the embodiment of FIG. 10 illustrating the chain line and suspension mount line.
Figure 13:
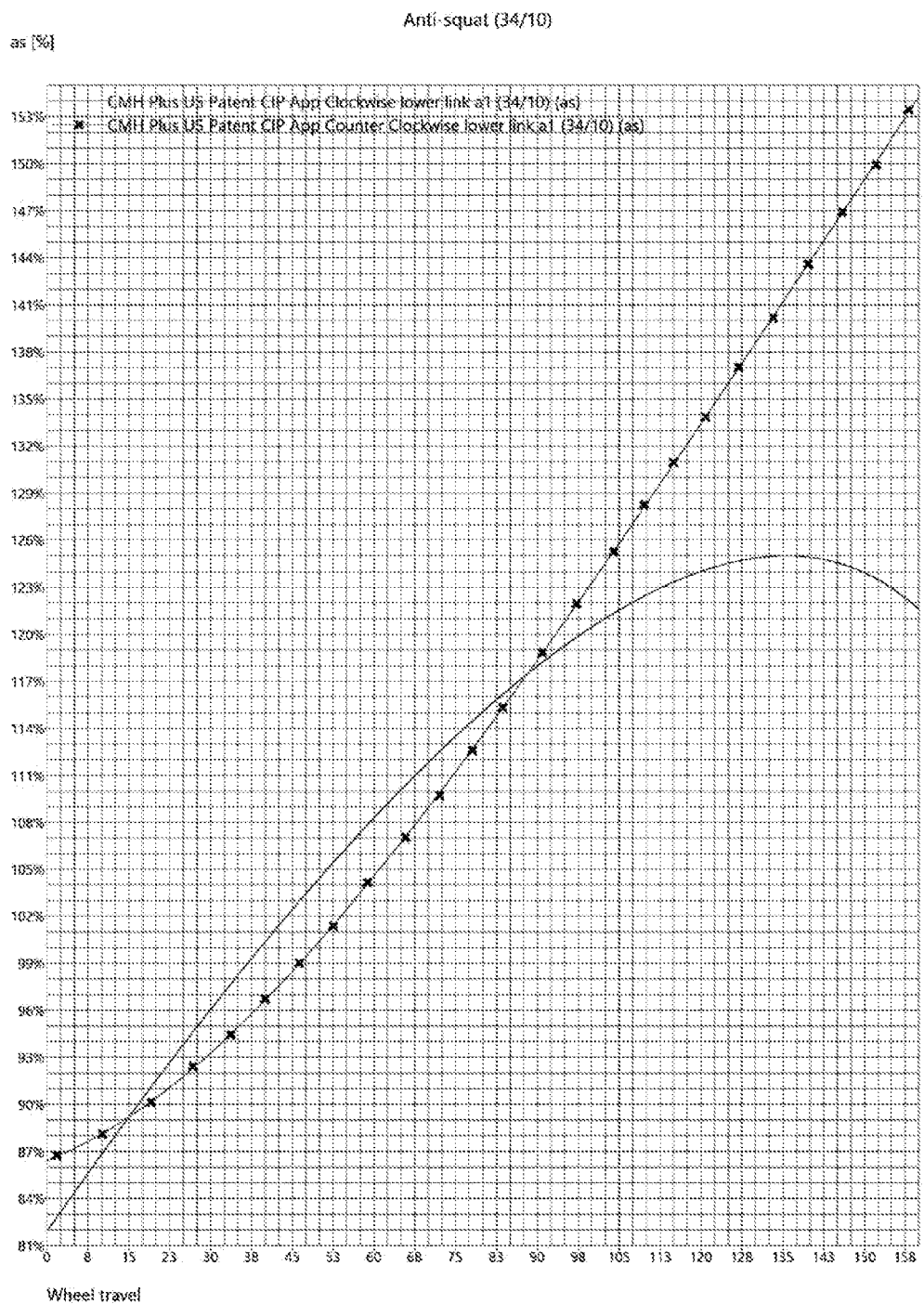
FIG. 13 is a graph showing anti squat for the embodiments shown in FIGS. 5 and 10, when using a chain ring with 34 teeth and a rear sprocket with 10 teeth.

The suspension embodiments of the present invention shown in FIGS. 5 and 10 are configured to clearly illustrate the over center anti squat effect, by showing the suspension configured to be in an over center condition regardless of the chain tension force vector. When a suspension is so configured, in use, the over center anti-squat is high. It is also possible to design the suspension so that the suspension is not so configured, but rather may be in an over center condition based on the angle of the chain tension force vector. This latter general configuration provides useful amounts of over center anti-squat, but does not unduly restrict suspension movement of the linkage.

It is understood that the higher above the chain line 222 that the seat stay-chain stay couple 172 is located, the greater the over center effect, because a greater percentage of the chain tension force vector is translated through the chain stay member. Preferably, the seat stay-chain stay couple 172 will be located so that the pivot axis of the seat stay-chain stay couple 172 is located above the chain line 222 when the chain 128 is located on the smallest rear sprocket 129 and the largest chainring 220.

The vertical location of the seat stay-frame pivot 162 is another design consideration in that the location may define the design chainring. The vertical location of the seat stay-frame pivot 162 is understood to define the "tipping point", i.e., where the over center effect becomes more important than conventional anti-squat in reducing or preventing squat. In general terms, the lower the vertical location of the seat stay-frame pivot 16, the smaller the design chainring is, and the greater the over center effect may be.

To be clear, it is possible to have both the over center effect and 100% (or more) conventional anti-squat. However, it is understood that over center anti-squat and conventional anti-squat are separate and independent of each other. They work in "opposite directions", in that: there is greater conventional anti-squat with smaller chainrings, (to put it simply, the smaller the chain ring, the more the chain tension force vector is below the instant center); and there is greater over center anti-squat with larger chainrings (because the angle of the chain line 222 (chain tension force vector) is greater than the angle of the suspension mount line 250).

Applicant understands that a desirable suspension design is one in which there is a "hand off" between conventional anti-squat and over center anti-squat at the design chainring. For example, such a design would be a bicycle having 100% anti-squat when using a 32 tooth chainring, with the suspension mount line 250 located so as to begin providing over center anti-squat when using a 33 tooth chainring. That is, as conventional anti-squat tapers off, over center anti-squat "tapers on".

Different designers may prefer different balancing between, and total amount of, conventional anti-squat and over center anti-squat, depending on the application and desired suspension feel.

It is understood that embodiments of the present invention also affect pedaling induced suspension bob that is not directly related to acceleration-induced weight transfer. This non-acceleration pedal bob is caused by the reciprocal, essentially circular motion of the legs.

Pedaling legs are akin to the pistons in a 2 piston engine; specifically a "Straight-twin" engine with a 180 degree crankshaft angle. Thus, it is useful to consider the pedaling legs in terms similar to those used with reciprocating engines. With respect to engine balance, primary, "first order" or "first harmonic" balance is generally used to indicate the balancing of items that could shake an engine once in every rotation of the crankshaft, i.e. having the frequency equal to one crank rotation. Secondary or "second order" balance generally refers to those items with the frequency of twice in one crank rotation.

In pedaling, the "primary balance" is largely (but not completely) balanced because one leg is going up while the other is moving down. It is not completely balanced because the center of mass of each leg moves around in a circle, with the "up stroke" part centered more or less under the rider's center of mass, and the "down stroke" located forward of the rider's center of mass. The unbalanced movement of the mass (legs) relative to the rider's center of mass creates an oscillation of force up and down, causing bob.

In pedaling, there is also a "secondary balance" that occurs because of variations in the speed of the "piston" (legs) as they rotate. The variation in speed and related difference in inertia between the two pistons/legs may create an oscillation of force (vibration) up and down, contributing to the non-acceleration pedal bob.

The existence of non-acceleration pedal bob can be observed when backpedaling on a conventional full-suspension bike. Even though there is no acceleration (and thus no weight transfer), the bike will bob up and down a detectable amount. Although this pedal bob is decoupled from acceleration, it does affect how a suspension "feels" and reacts under acceleration.

To be clear, non-acceleration pedal bob is affected by pedaling speed; it is lessened if the rider pedals slowly, as in the case where the rider is "pushing hard gears". Because the rider's legs aren't moving quickly, the forces are distributed over a long time frame, so they don't affect the suspension much.

Applicant understands that the suspension design factors that affect non-acceleration pedal bob are as follows: the slope (rate of change) of the amount of anti-squat around the sag point, and horizontal location of the instant center within the bicycle frame.

The slope (rate of change) of the anti-squat curve is relevant because the non-acceleration pedal bob is not caused by acceleration but it may affect bike acceleration response. If the anti-squat value remains "the same" across a range of sag values around the sag point, the non-acceleration pedal bob induced bob does not change the anti-squat value, resulting in a consistent acceleration response. On the other hand, if the anti-squat value changes a significant amount around the sag point, then the suspension movement caused by pedal bob changes the anti-squat value a significant amount. This varying anti-squat value results in more or less suspension movement caused by acceleration, or a varying acceleration response, which results in some acceleration induced suspension movement (albeit generally minor).

In terms of non-acceleration pedal bob, it is understood that an acceptable acceleration response is provided by a change in anti-squat values of no more than 15%, between 20% sag and 40% sag. A change in anti-squat values of no more than 10%, between 20% sag and 40% sag, is more preferable.

If the instant center is located "underneath" (i.e., in vertical alignment with) the imbalanced forces causing non-acceleration pedal bob, the bobbing force is distributed more or less equally between the front shock (fork) and the rear suspension. Locating the instant center rearward of this vertical alignment tends to cause the front forks to bob more than the rear suspension. Locating the instant center forward of this vertical alignment tends to cause the rear suspension to bob more than the front forks.

It is understood that a suitable vertical alignment for the instant center is between the axis of rotation of the bottom bracket and a location forward of the axis of rotation of the bottom bracket about ¾ the length of the crank arm. More preferably, the vertical alignment for the instant center is between the axis of rotation of the bottom bracket and a location forward of the axis of rotation of the bottom bracket about ½ the length of the crank arm. Even more preferably, the vertical alignment for the instant center is at a location forward of the axis of rotation of the bottom bracket about ⅓ the length of the crank arm.

The present invention encompasses a plurality of different configurations and embodiments.

The following approaches are at times used herein for providing numerical information for the position of components and pivots/couples with respect to an exemplary bicycle wheel size (i.e., 27.5" wheels, though the suspension system of the current invention is not limited to any particular wheel size) with the bicycle not loaded (i.e., with the suspension system at its uncompressed "at-rest" position) and with a flat surface supporting both wheels of the bicycle:

1. an X,Y coordinate system with the X axis parallel to the flat surface, with the intersection of the X axis and Y axis aligned with the axis of rotation within the bottom bracket, and with the units in millimetres; and
2. a combination of radial distances and angles, with the radial distances in millimetres from the axis of rotation of the rear wheel, and the angles as at the axis of rotation of the rear wheel measured from a line extending forward from the axis of rotation of the rear wheel parallel to the flat surface.

In what follows, negative X values for pivot locations may be bounded by the radius of the rear wheel 130. However, it is understood that it is possible to have pivot and couple locations that intrude into the radius of the rear wheel. For example, the seat stay-frame pivot 162 could be defined by two aligned components, one on each side of the rear wheel 130.

Figure 2:
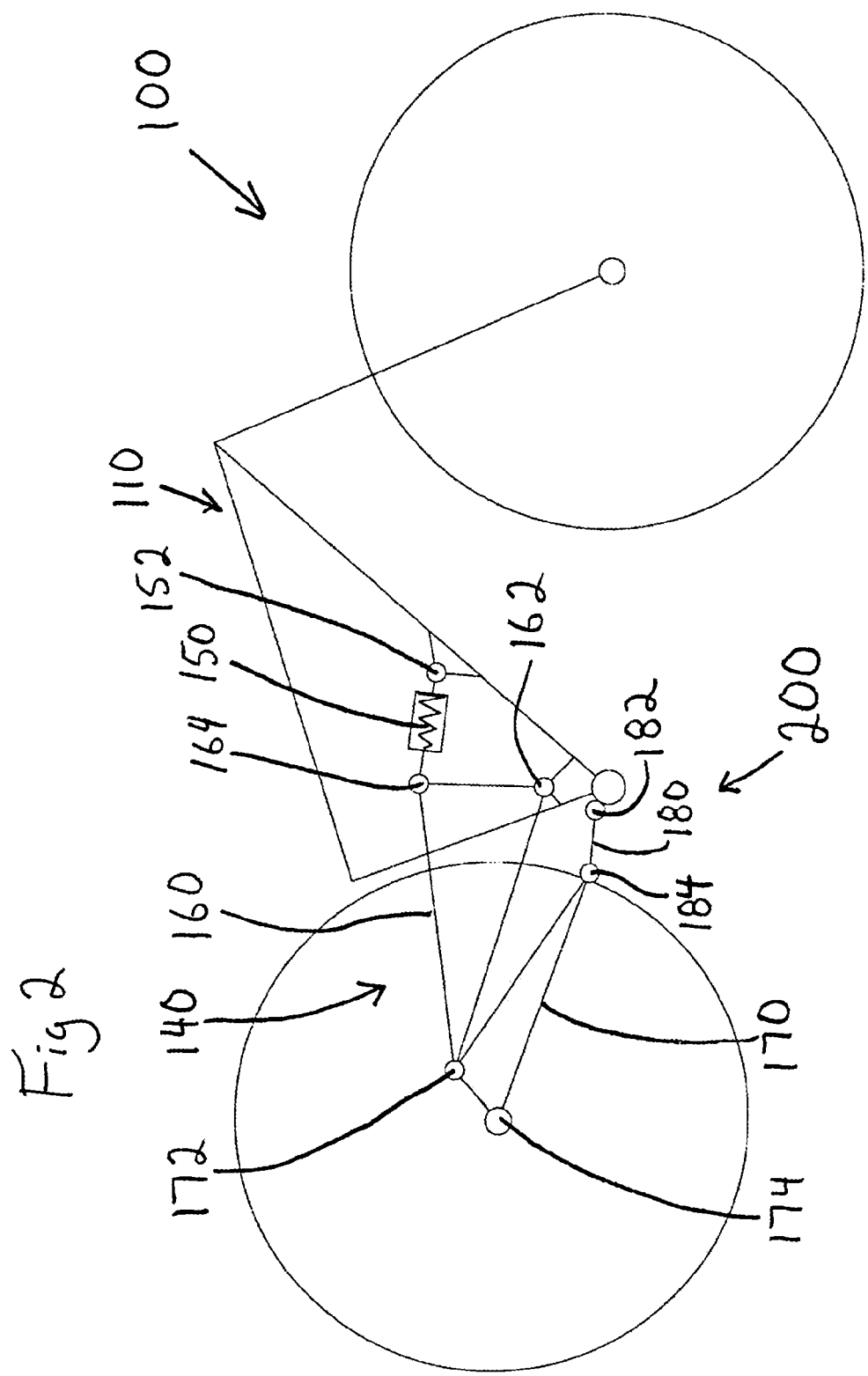
FIG. 2 is a schematic right-side elevation view of the embodiment of FIG. 1, shown in a compressed position.
Figure 3:
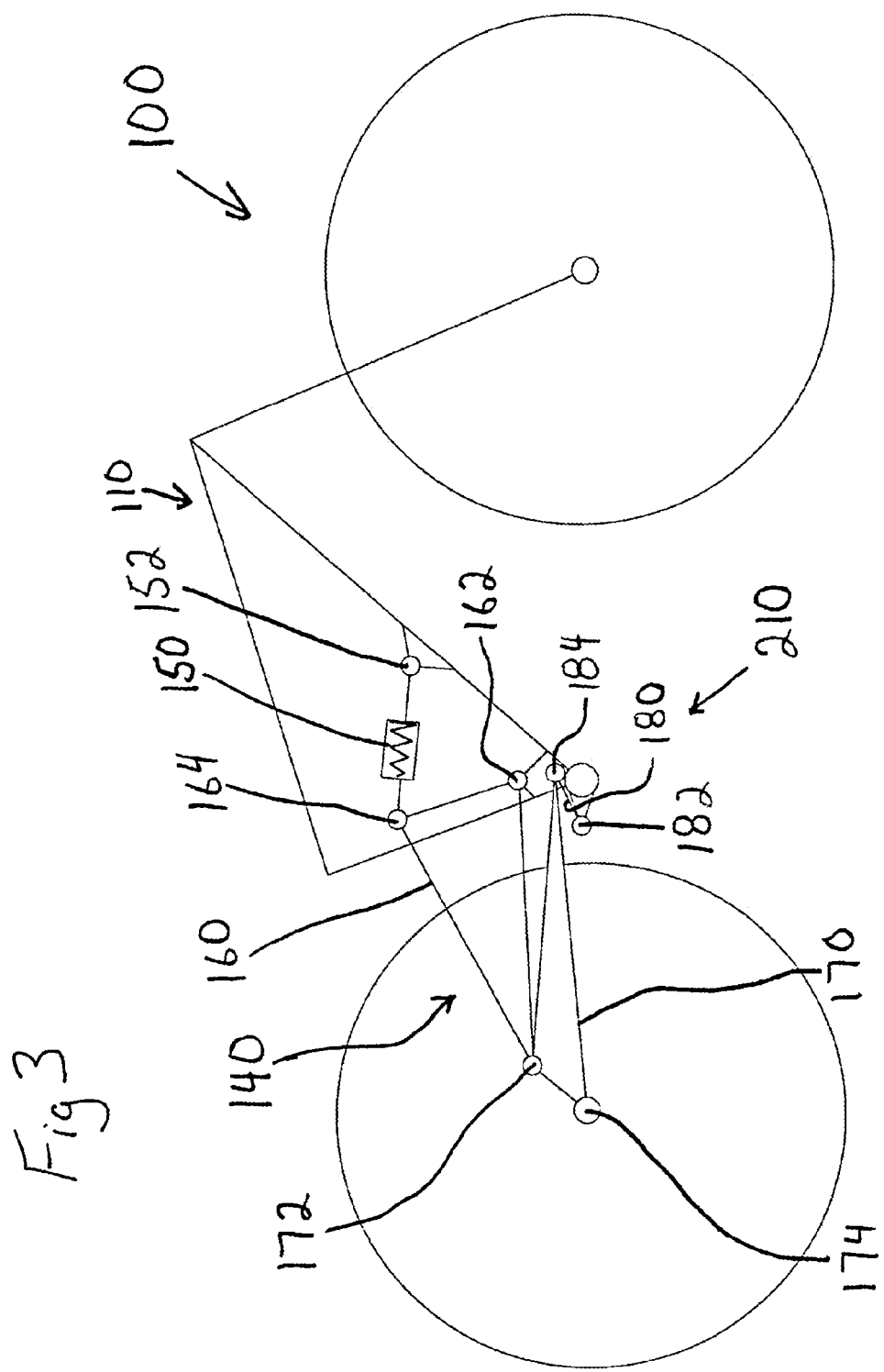
FIG. 3 is a schematic right-side elevation view of a stylized embodiment of the present invention with the pivot locations spread apart to assist in visualization of the components, having a link with the link in the counter-clockwise pivoting configuration, shown in the un-loaded "at rest" position.
Figure 4:
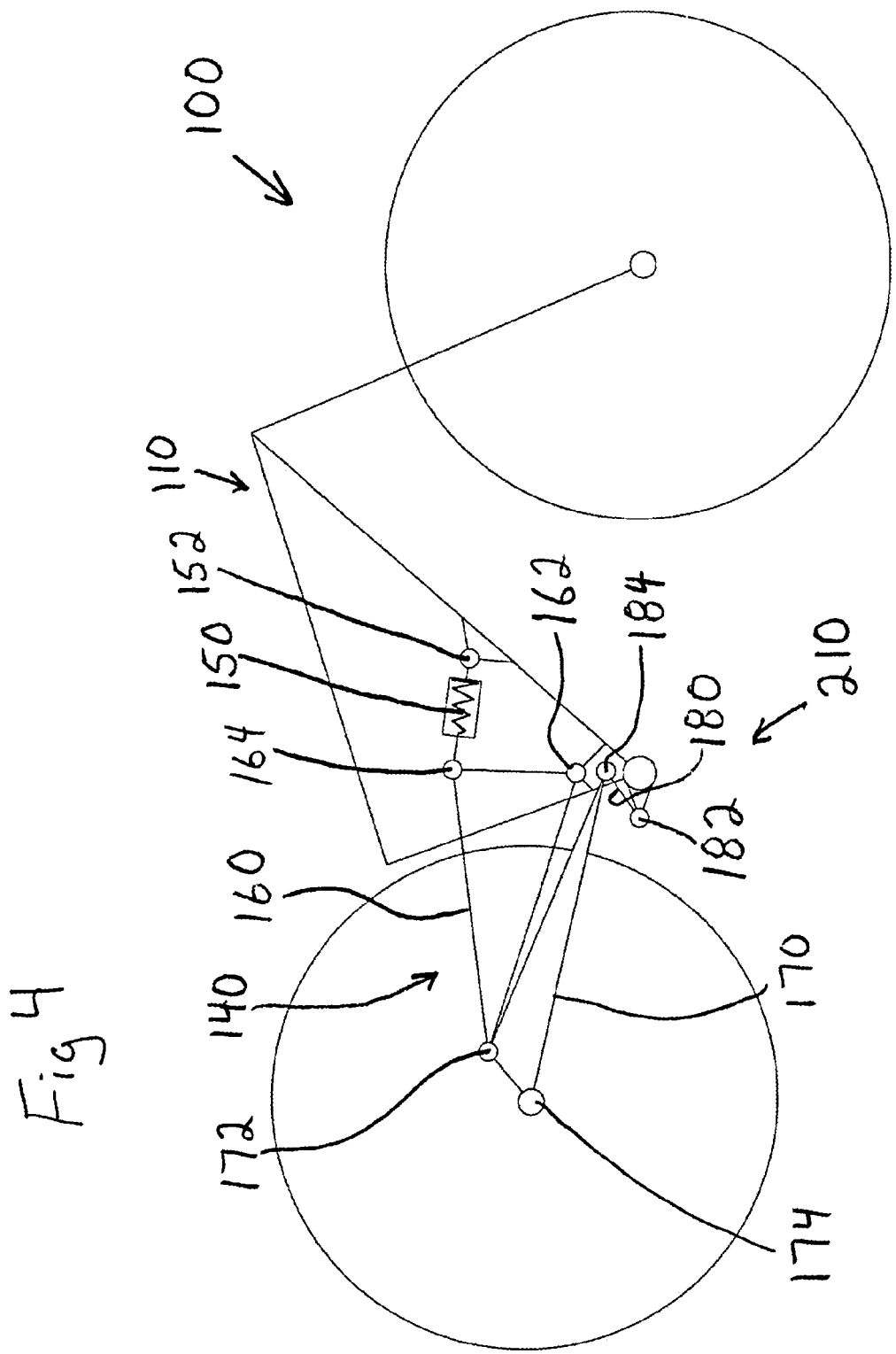
FIG. 4 is a schematic right-side elevation view of the embodiment of FIG. 3, shown in a compressed position.

To illustrate how the components move relative to each other in use, a clockwise pivoting configuration 200 is shown in the un-loaded "at rest" position in FIG. 1 and in a compressed position in FIG. 2; and a counter-clockwise pivoting configuration 210 is shown in the un-loaded "at rest" position in FIG. 3 and in a compressed position in FIG. 4.

Using the X,Y coordinate system described above (including the bicycle being in the "at-rest" position), the coordinates for the clockwise pivoting embodiment shown in FIG. 5 are as follows:
axis of rotation of bottom bracket 118: 0 mm, 0 mm
rear wheel axis of rotation 132: −437 mm, 12 mm
pivot axis of seat stay-frame pivot 162: 78.5 mm, 56.6 mm
pivot axis of link-frame pivot 182: −6.7 mm, 53.4 mm
pivot axis of link-chain stay couple 184: −39.4 mm, 25.1 mm
pivot axis of seat stay-chain stay couple 172: −361.9 mm, 93.3 mm At 20% sag, the anti-squat value for the clockwise pivoting embodiment shown in FIG. 5 is 96.9%, and at 40% sag it is 109.7%; the difference being 12.8%.

Figure 8:
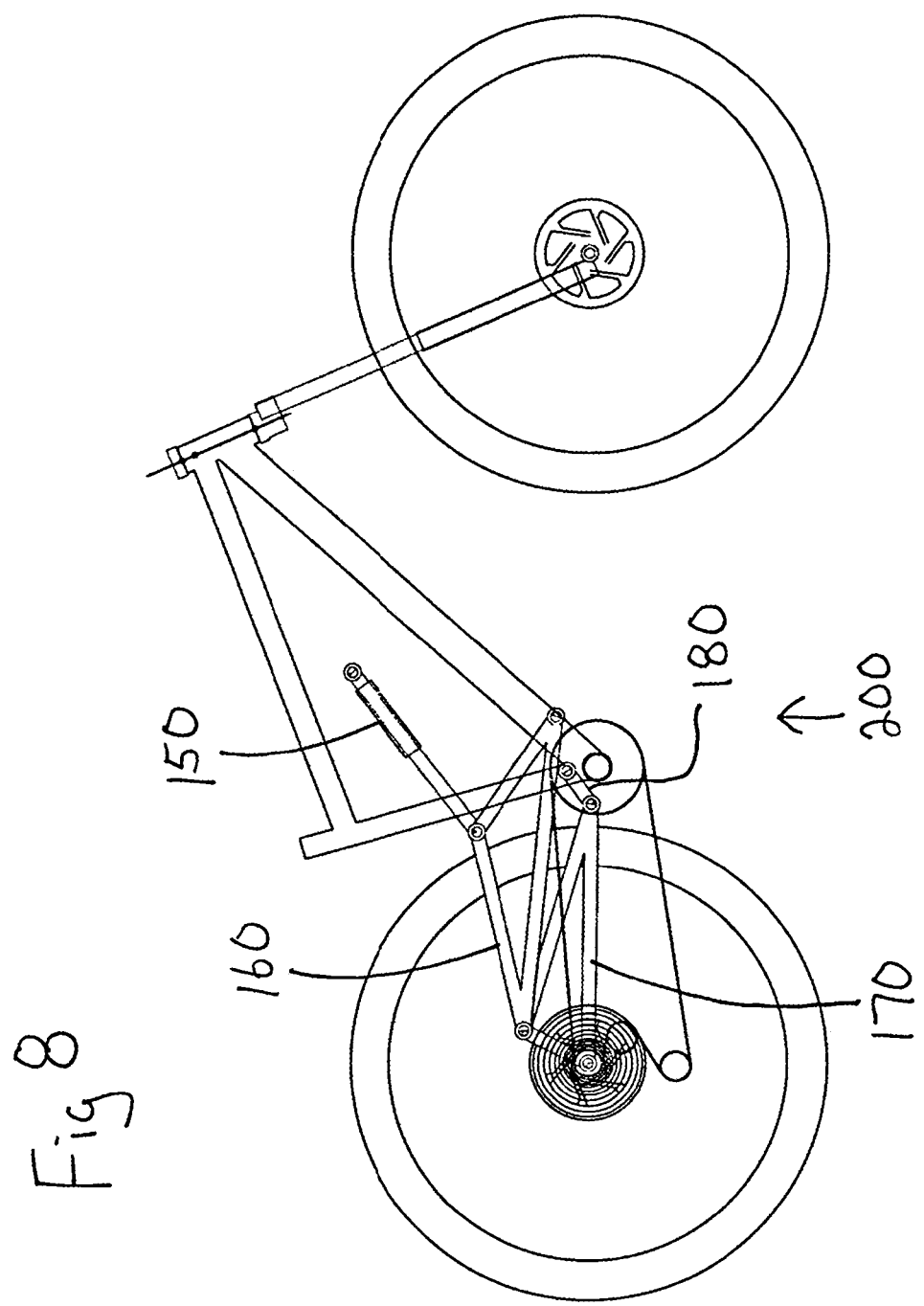
FIG. 8 is a schematic right-side elevation view of a second exemplary embodiment of the present invention having a link with the link in the clockwise pivoting configuration, shown in the un-loaded "at rest" position.
Figure 9:
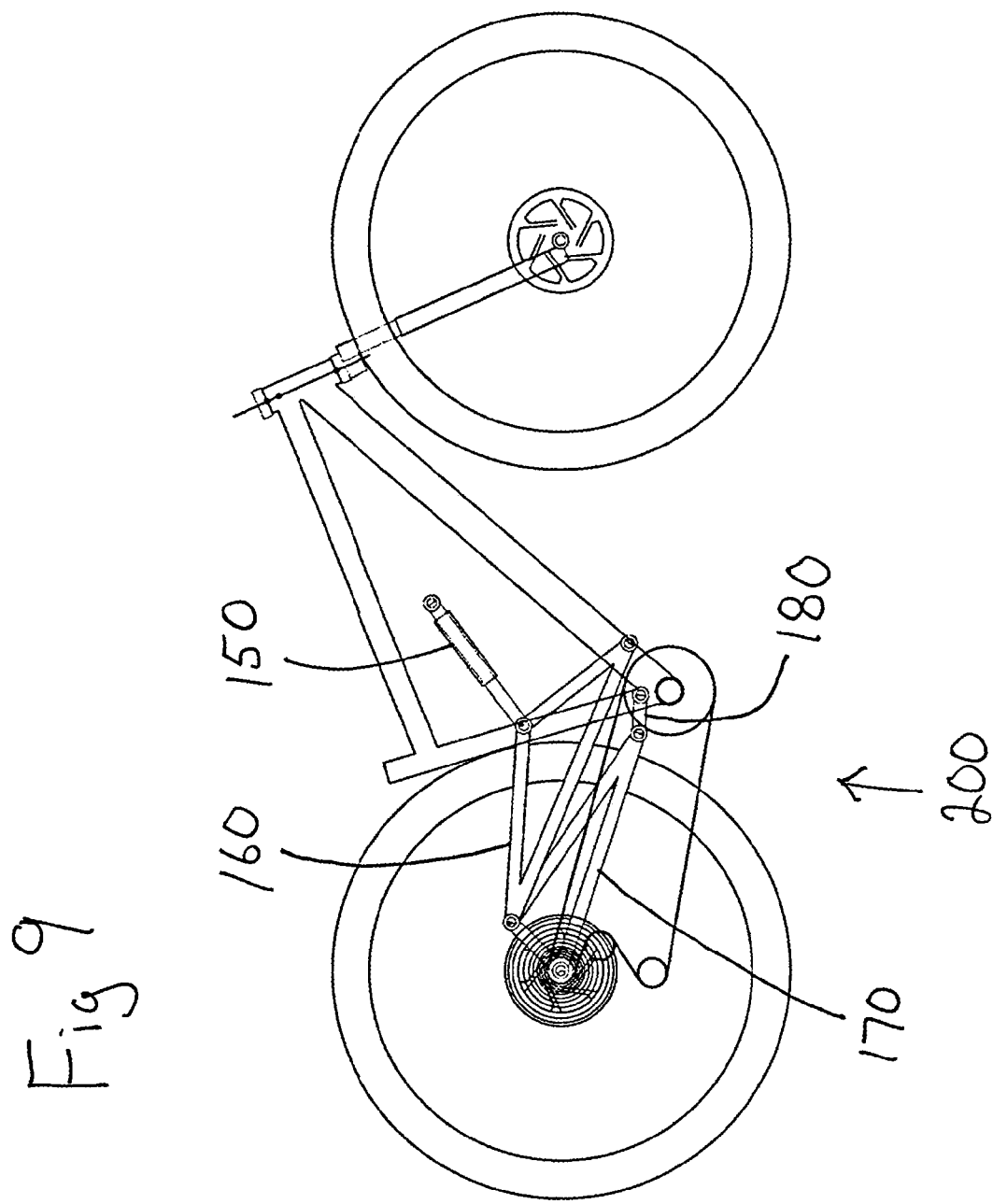
FIG. 9 is a schematic right-side elevation view of the embodiment of FIG. 8, shown in a compressed position.

Using the X,Y coordinate system described above (including the bicycle being in the "at-rest" position), the coordinates for the clockwise pivoting embodiment shown in FIG. 8, which has a lesser over center effect as compared to the embodiment shown in FIG. 5, in that the embodiment shown in FIG. 8 provides over center anti-squat in larger chain rings, are as follows:
axis of rotation of bottom bracket 118: 0 mm, 0 mm
rear wheel axis of rotation 132: −437 mm, 12 mm
pivot axis of seat stay-frame pivot 162: 74.2 mm, 60.5 mm
pivot axis of link-frame pivot 182: −6.1 mm, 44.3 mm
pivot axis of link-chain stay couple 184: −54.4 mm, 8.8 mm
pivot axis of seat stay-chain stay couple 172: −389.5 mm, 106.3 mm Using the X,Y coordinate system described above (including the bicycle being in the "at-rest" position), the coordinates for a counter-clockwise pivoting embodiment shown in FIG. 10 are as follows:
axis of rotation of bottom bracket 118: 0 mm, 0 mm
rear wheel axis of rotation 132: −437 mm, 12 mm
pivot axis of seat stay-frame pivot 162: 72 mm, 58.4 mm
pivot axis of link-frame pivot 182: −35.4 mm, 55.4 mm
pivot axis of link-chain stay couple 184: 9.2 mm, 67.3 mm
pivot axis of seat stay-chain stay couple 172: −403.2 mm, 78.3 mm At 20% sag, the anti-squat value for the counter-clockwise pivoting embodiment shown in FIG. 10 is 93.9%, and at 40% sag it is 106.3%; the difference being 12.4%.

Using the X,Y coordinate system described above (including the bicycle being in the "at-rest" position), the coordinates for a counter-clockwise pivoting embodiment having a "typical" conventional anti-squat and suspension efficiency gains as the suspension approaches over center, are as follows:
axis of rotation of bottom bracket 118: 0 mm, 0 mm
rear wheel axis of rotation 132: −437 mm, 12 mm
pivot axis of seat stay-frame pivot 162: 72.2 mm, 65.3 mm
pivot axis of link-frame pivot 182: −37.2 mm, 45.2 mm
pivot axis of link-chain stay couple 184: −5.3 mm, 49.1 mm
pivot axis of seat stay-chain stay couple 172: −357.9 mm, 79.4 mm Using the X,Y coordinate system described above (including the bicycle being in the "at-rest" position), the coordinates for a counter-clockwise pivoting embodiment having a "low" conventional anti-squat and a "high" over center anti-squat effect, are as follows:
axis of rotation of bottom bracket 118: 0 mm, 0 mm
rear wheel axis of rotation 132: −437 mm, 12 mm
pivot axis of seat stay-frame pivot 162: 44.2 mm, 30.4 mm
pivot axis of link-frame pivot 182: −43.1 mm, 54.1 mm
pivot axis of link-chain stay couple 184: −0.5 mm, 71.6 mm
pivot axis of seat stay-chain stay couple 172: −377.8 mm, 87.9 mm In the embodiments described above and shown in the drawings, the shock absorber 150 is mounted at its proximal end to the frame 110 and coupled at its distal end to the seat stay member 160. To be clear, multiple other configurations of the shock absorber 150 are possible. For example, the shock absorber 150 could be interconnected between other components (for example, between the link 180 and the frame 110). As well, the shock absorber 150 need not be directly connected to a component, in that there may be intervening connectors or linkages between the shock absorber 150 and another component. Various configurations and arrangements for devices for absorbing shocks are known in the art. For example, in some cases, particularly in long travel downhill designs, it may be advantageous to use a linkage (not shown) between the shock absorber 150 and the seat stay member 160 so as to permit adjustments or specific shock rates not readily achievable when the shock absorber 150 is directly coupled to the seat stay member 160.

As is well known in bike rear suspension design, flexible members could be used to provide functionality akin to a pivot or couple described herein.

Advantageously, embodiments of the present invention may be readily configured so as to avoid interfering with a "standard" front derailleur mounting position/location.

Aspects of embodiments of the present invention may have application in other suspension systems, for example in motorcycles or other vehicles with suspensions.

The invention claimed is:

1. A bicycle suspension system for attaching a rear wheel with a rear wheel axis of rotation and one or more different sized sprockets, to a bicycle frame having a right side, being on the right hand side when the bicycle frame is viewed from the rear, and having a bottom bracket with a bottom bracket axis of rotation, a pair of crank arms and one or more different sized chain rings, the one or more sprockets and the one or more chainrings defining at least one chain line, being the line defined by a chain under tension between the top of a sprocket and the top of a chain ring, the suspension system comprising:
a seat stay member that in use is pivotally attached to a bicycle frame at a seat stay-frame pivot having a seat stay-frame pivot axis;
a link member that in use is attached to the bicycle frame at a link-frame pivot having link-frame pivot axis;
a chain stay member having a wheel mount suitable for receiving a rear wheel axle and defining a rear wheel axis of rotation, wherein, in use:
the chain stay member is pivotally coupled to the seat stay member at a seat stay-chain stay couple having a seat stay-chain stay couple pivot axis located upward of the rear wheel axis of rotation; and
the chain stay member is pivotally coupled to the link member at a link-chain stay couple having a link-chain stay couple pivot axis;
a shock absorber device that in use is directly or indirectly interconnected between two of the seat stay member, link member, the chain stay and the bicycle frame, for resiliently impeding relative movement of the components from an at-rest position;
wherein, with the suspension system at a desired sag and the bicycle supported on a horizontal surface, the angle above the horizontal of a line passing through the seat stay-frame pivot axis and the link-frame pivot axis is less than or about equal to the angle above the horizontal of at least one of the one or more chain lines.

2. The suspension system of claim 1, wherein with the suspension system at the desired sag and the bicycle supported on a horizontal surface, the angle above the horizontal of a line passing through the seat stay-frame pivot axis and the link-frame pivot axis is less than the angle above the horizontal of a chain line defined by the largest chain ring and the smallest sprocket.

3. The suspension system of claim 1, wherein with the suspension system at the desired sag and the bicycle supported on a horizontal surface, the angle above the horizontal of a line passing through the seat stay-frame pivot axis and the link-frame pivot axis is less than the angle above the horizontal of a chain line defined by a design chain ring and the smallest sprocket.

4. The suspension system of claim 1, wherein, with the suspension system at the desired sag and the bicycle supported on a horizontal surface, the seat stay-chain stay couple pivot axis is above a chain line defined by a design chain ring and the smallest sprocket.

5. The suspension system of claim 1, wherein, with the suspension system at the desired sag and the bicycle supported on a horizontal surface, the seat stay-chain stay couple pivot axis is below a chain line defined by a design chain ring and the smallest sprocket.

6. The suspension system of claim 1, wherein, the distance between the link-frame pivot axis and the link-chain stay couple pivot axis is less than the distance between the link-chain stay couple pivot axis and the rear wheel axis of rotation.

7. The suspension system of claim 1, wherein, during movement of the suspension system from extension to compression, when viewed from the right side, the link member pivots relative to the bicycle frame in a clockwise direction.

8. The suspension system of claim 7, wherein, in terms of an X,Y coordinate system with the X axis parallel to an imaginary flat surface supporting both wheels of the bicycle with the bicycle not loaded and with the intersection of the X axis and Y axis aligned with the bottom bracket axis of rotation, the coordinates are about as follows:
rear wheel axis of rotation: −437 mm, 12 mm
seat stay-frame pivot axis: 78.5 mm, 56.6 mm
link-frame pivot axis: −6.7 mm, 53.4 mm
link-chain stay couple pivot axis: −39.4 mm, 25.1 mm
seat stay-chain stay couple pivot axis: −361.9 mm, 93.3 mm.

9. The suspension system of claim 7, wherein in terms of an X,Y coordinate system with the X axis parallel to an imaginary flat surface supporting both wheels of the bicycle with the bicycle not loaded and with the intersection of the X axis and Y axis aligned with the bottom bracket axis of rotation, the coordinates are about as follows:
rear wheel axis of rotation: −437 mm, 12 mm
seat stay-frame pivot axis: 74.2 mm, 60.5 mm
link-frame pivot axis: −6.1 mm, 44.3 mm
link-chain stay couple pivot axis: −54.4 mm, 8.8 mm
seat stay-chain stay couple pivot axis: −389.5 mm, 106.3 mm.

10. The suspension system of claim 1, wherein during movement of the suspension system from extension to compression, when viewed from the right side, the link member pivots relative to the bicycle frame in a counter-clockwise direction.

11. The suspension system of claim 10, wherein in terms of an X,Y coordinate system with the X axis parallel to an imaginary flat surface supporting both wheels of the bicycle with the bicycle not loaded and with the intersection of the X axis and Y axis aligned with the bottom bracket axis of rotation, the coordinates are about as follows:
rear wheel axis of rotation: −437 mm, 12 mm
seat stay-frame pivot axis: 72 mm, 58.4 mm
link-frame pivot axis: −35.4 mm, 55.4 mm
link-chain stay couple pivot axis: 9.2 mm, 67.3 mm
seat stay-chain stay couple pivot axis: −403.2 mm, 78.3 mm.

12. The suspension system of claim 10, wherein in terms of an X,Y coordinate system with the X axis parallel to an imaginary flat surface supporting both wheels of the bicycle with the bicycle not loaded and with the intersection of the X axis and Y axis aligned with the bottom bracket axis of rotation, the coordinates are about as follows:
rear wheel axis of rotation: −437 mm, 12 mm
seat stay-frame pivot axis: 72.2 mm, 65.3 mm
link-frame pivot axis: −37.2 mm, 45.2 mm
link-chain stay couple pivot axis: −5.3 mm, 49.1 mm
seat stay-chain stay couple pivot axis: −357.9 mm, 79.4 mm.

13. The suspension system of claim 10, wherein in terms of an X,Y coordinate system with the X axis parallel to an imaginary flat surface supporting both wheels of the bicycle with the bicycle not loaded and with the intersection of the X axis and Y axis aligned with the bottom bracket axis of rotation, the coordinates are about as follows:
rear wheel axis of rotation: −437 mm, 12 mm
seat stay-frame pivot axis: 44.2 mm, 30.4 mm
link-frame pivot axis: −43.1 mm, 54.1 mm
link-chain stay couple pivot axis: −0.5 mm, 71.6 mm
seat stay-chain stay couple pivot axis: −377.8 mm, 87.9 mm.

14. The suspension system of claim 1, wherein movement of the chain stay member relative to the bicycle frame, during suspension compression and extension, defines an instant center and wherein with the suspension system at the desired sag the instant center is at a position between vertical alignment with the axis of rotation of the bottom bracket and vertical alignment of a location forward of the axis of rotation of the bottom bracket about ¾ the length of One of the pair of crank arms.

15. The suspension system of claim 14, wherein the instant center is at a position between vertical alignment with the axis of rotation of the bottom bracket and vertical alignment of a location forward of the axis of rotation of the bottom bracket about ½ the length of one of the crank arms.

16. The suspension system of claim 14, wherein the instant center is at a position forward of the axis of rotation of the bottom bracket about ⅓ the length of one of the crank arms.

17. The suspension system of claim 1, wherein, with the suspension system at a desired sag and the bicycle supported on a horizontal surface, the angle above the horizontal of a line passing through the seat stay-frame pivot axis and the link-frame pivot axis is less than the angle above the horizontal of at least one of the one or more chain lines.

18. The suspension system of claim 1, wherein in use, the shock absorber device is interconnected between the seat stay member and the bicycle frame.

19. A bicycle comprising the suspension system of claim 1.

* * * * *